(12) United States Patent
Xu et al.

(10) Patent No.: US 11,479,661 B2
(45) Date of Patent: Oct. 25, 2022

(54) RUBBER COMPOSITION, AGING-RESISTANT RUBBER PRODUCT USING THE SAME

(71) Applicant: HANGZHOU XINGLU TECHNOLOGIES CO., LTD, Zhejinag (CN)

(72) Inventors: Tao Xu, Hangzhou (CN); Zhi Sheng Fu, Hangzhou (CN); An Yang Wu, Hangzhou (CN)

(73) Assignee: HANGZHOU XINGLU TECHNOLOGIES CO., LTD., Hangzhou (CN)

( * ) Notice: Subject to any disclaimer, the term of this patent is extended or adjusted under 35 U.S.C. 154(b) by 404 days.

(21) Appl. No.: 16/477,747

(22) PCT Filed: Jan. 12, 2018

(86) PCT No.: PCT/CN2018/072361
§ 371 (c)(1),
(2) Date: Jul. 12, 2019

(87) PCT Pub. No.: WO2018/130192
PCT Pub. Date: Jul. 19, 2018

(65) Prior Publication Data
US 2019/0359806 A1    Nov. 28, 2019

(30) Foreign Application Priority Data
Jan. 13, 2017  (CN) .......................... 201710025140.8
Jan. 10, 2018  (CN) .......................... 201810020850.6

(51) Int. Cl.
| | |
|---|---|
| C08L 23/06 | (2006.01) |
| C08L 23/16 | (2006.01) |
| B60C 1/00 | (2006.01) |
| B60S 1/38 | (2006.01) |
| F16F 1/36 | (2006.01) |
| E01D 19/04 | (2006.01) |
| E01D 19/06 | (2006.01) |
| F16G 1/06 | (2006.01) |

(52) U.S. Cl.
CPC ................ *C08L 23/06* (2013.01); *B60C 1/00* (2013.01); *B60S 1/38* (2013.01); *C08L 23/16* (2013.01); *E01D 19/041* (2013.01); *E01D 19/06* (2013.01); *F16F 1/3605* (2013.01); *F16G 1/06* (2013.01); *B60S 2001/3829* (2013.01); *C08L 2205/025* (2013.01); *C08L 2205/03* (2013.01); *C08L 2205/06* (2013.01); *C08L 2207/07* (2013.01); *C08L 2207/322* (2013.01); *C08L 2312/00* (2013.01)

(58) Field of Classification Search
CPC .... C08L 23/16; C08L 23/06; C08L 2205/025; C08L 2205/03; C08L 2312/00; C08L 2205/06; C08L 2207/322; C08L 2207/07; B60C 1/00; B60S 1/38; F16F 1/3605; F16G 1/06; E01D 19/041; E01D 19/06
See application file for complete search history.

(56) References Cited

U.S. PATENT DOCUMENTS

| | | | |
|---|---|---|---|
| 6,103,658 A | 8/2000 | Mackenzie et al. | |
| 6,294,600 B1 | 9/2001 | Takada et al. | |
| 6,660,677 B1 | 12/2003 | Mackenzie et al. | |

FOREIGN PATENT DOCUMENTS

| | | | |
|---|---|---|---|
| CN | 1272862 A | | 11/2000 |
| CN | 101028888 A | | 9/2007 |
| CN | 101531725 A | | 9/2009 |
| CN | 101812145 A | | 8/2010 |
| CN | 102827312 A | | 12/2012 |
| CN | 103980596 A | * | 8/2014 |
| CN | 103980596 A | | 8/2014 |
| CN | 104877225 A | | 9/2015 |
| CN | 104910487 A | | 9/2015 |
| CN | 104926962 A | | 9/2015 |
| CN | 105239502 A | | 1/2016 |
| EP | 0050039 A2 | | 4/1982 |

OTHER PUBLICATIONS

SIPO, International Search Report issued in IA No. PCT/CN2018/072361 dated Apr. 17, 2018.

* cited by examiner

*Primary Examiner* — Robert D Harlan
(74) *Attorney, Agent, or Firm* — Lorenz & Kopf, LLP

(57) ABSTRACT

The present invention discloses a rubber composition, a processing method thereof, and an aging resistant rubber product using the rubber composition. The rubber composition comprises a rubber matrix and essential components, wherein, based on 100 parts by weight of the rubber matrix, the rubber matrix comprises a branched polyethylene with a content represented as A, in which 0<A≤100 parts, and an EPM and an EPDM with a content represented as B, in which 0≤B<100 parts; and the essential components comprise 1.5-10 parts of a crosslinking agent, 30-200 parts of a reinforcing filler, and 5-250 parts of a plasticizer. The rubber composition provided by present invention has good processability and can be used for producing rubber products with high aging resistance and compression set resistance.

19 Claims, No Drawings

RUBBER COMPOSITION, AGING-RESISTANT RUBBER PRODUCT USING THE SAME

CROSS REFERENCE TO RELATED APPLICATIONS

The present application is the U.S. national phase of and claims priority to International Patent Application No. PCT/CN2018/072361 filed on Jan. 12, 2018, which claims the benefit of priority from China National Application No. 201710025140.8, filed on Jan. 13, 2017 and China National Application No. 201810020850.6, filed on Jan. 10, 2018, the entire content of each of which is incorporated herein by reference into the present disclosure as if fully set forth herein.

TECHNICAL FIELD

The present invention relates to the technical field of rubber, and in particular to a rubber composition, and a processing method thereof, and further to aging-resistant rubber product using the rubber composition and a production method thereof.

BACKGROUND

Due to its excellent aging resistance and good compression set resistance, ethylene-propylene rubber is widely used in various situations where high aging resistance and/or compression set resistance are required. Sulfur vulcanization and peroxide vulcanization are two conventional vulcanization methods for ethylene-propylene rubber. In order to obtain better aging resistance and compression set resistance, peroxide crosslinking systems are now gradually used. However, the mechanical strength of peroxide-vulcanized ethylene-propylene rubber is lower than that of sulfur-vulcanized ethylene-propylene rubber, which will lead to an increased risk of damage to the product during actual use. Therefore, there is an urgent technical problem to improve both the aging resistance and the mechanical strength of ethylene-propylene rubber.

Ethylene-propylene rubbers are a kind of synthetic rubbers with a saturated molecular backbone, and include ethylene-propylene monomer (EPM) and ethylene-propylene-diene monomer (EPDM), both of which have good aging resistance. EPDM is commonly used in the ethylene-propylene rubber products. However, since EPDM contains a third monomer with a molecular chain having a double bond and EPM has a completely saturated molecular chain, EPM has more excellent aging resistance. Therefore, in a situation where a higher requirement is raised for the aging resistance, it is a common technical solution to use EPM in combination to improve the aging resistance of EPDM. However, the mechanical strength of EPM is low, which affects the overall physical and mechanical properties.

EPM is a copolymer of ethylene and propylene, which is a copolymer of ethylene and an α-olefin. The copolymer of ethylene and an α-olefin is a polymer containing only carbon and hydrogen elements and having a saturated molecular chain. The common types of carbon atoms found in such polymers generally include primary, secondary and tertiary carbons, in which the tertiary carbon is most susceptible to hydrogen abstraction to form a free radical. Accordingly, the proportion of tertiary carbon atoms in all carbon atoms is generally considered to be a major factor affecting the aging resistance of ethylene/α-olefin copolymers. The lower the proportion is, the better the aging resistance will be. The proportion can be expressed by the degree of branching. For example, EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. EPM usually has an ethylene content of 40-65% or 40-60% by weight, so the degree of branching is generally in the range of 117-200 branches/1000 carbon atoms or 133-200 branches/1000 carbon atoms. This degree of branching is considered to be higher than that of other common ethylene/α-olefin copolymers.

In the prior art, the α-olefin in the common ethylene/α-olefin copolymers may include, in addition to propylene, an α-olefin having a carbon number of not less than 4, which may be selected from a $C_4$-$C_{20}$ α-olefin, and is generally selected from 1-butene, 1-hexene and 1-octene. If the degree of branching of an ethylene/α-olefin copolymer is too low, the melting point and crystallinity are too high, so it is not suitable for use as a rubber component. If the degree of branching is too high, the content of α-olefin is high, which leads to a higher process difficulty and raw material cost, and a lower operability and economical efficiency. In the prior art, a polyolefin obtained by copolymerizing ethylene with 1-butene or ethylene with 1-octene can be referred to as a polyolefin plastomer or a polyolefin elastomer according to the magnitudes of crystallinity and melting point. Due to their proper crystallinity and melting point, some polyolefin elastomer grades can be well used in combination with an ethylene-propylene rubber and have a low degree of branching, so they are considered to be an ideal material for improving the aging resistance of ethylene-propylene rubbers, and can be used in place of ethylene-propylene rubbers to some extent. Since an ethylene/1-octene copolymer has more flexible molecular chain, higher rubber elasticity, and better mechanical performance than an ethylene/1-butene copolymer, the polyolefin elastomer commonly used in rubber products is generally a copolymer of ethylene and 1-octene at present, in which the octene content in percentages by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of EPM. Therefore, the ethylene/1-octene copolymer has excellent aging resistance and good physical and mechanical properties.

Rubbers are usually used after cross-linking. Among common cross-linking methods for ethylene-propylene rubbers, peroxide cross-linking or radiation cross-linking can be suitably used for a copolymer of ethylene and an α-olefin, both of which mainly comprising: forming a tertiary carbon radical by hydrogen abstraction from a tertiary carbon and then creating a carbon-carbon crosslink by free radical bonding. However, an ethylene/1-octene copolymer (hereinafter referred to as POE) has a low number of tertiary carbon atoms and has a longer branch attached to the tertiary carbon atom, so the steric hindrance is large, and the free radical reaction is difficult to occur, resulting in difficulty in crosslinking, thus affecting the processing efficiency and product performance. For example, the compression set resistance is unsatisfactory.

Therefore, there is currently a need for a better technical solution, which can improve the aging resistance of ethylene-propylene rubbers while the rubber composition has good physical and mechanical properties and cross-linking performances, and is expected to behave well with respect to particular functional performances of rubber product (for example, compression set resistance and so on).

SUMMARY

In view of the technical problems existing in the prior art that sulfur-vulcanized ethylene-propylene rubber is susceptible to aging, and the tear strength of peroxide-vulcanized ethylene-propylene rubber is lower than that of sulfur-vulcanized ethylene-propylene rubber, the present invention provides a novel rubber composition and a processing method thereof, and also provides aging-resistant rubber products using the rubber composition and production method therefor.

To achieve the above object, the following technical solutions are adopted in the present invention. A rubber composition is provided, which comprises a rubber matrix and essential components. The rubber matrix comprises, in parts by weight, a branched polyethylene with a content represented as A, in which 0<A≤100 parts, and an ethylene-propylene rubber with a content represented as B, in which 0≤B<100 parts; and based on 100 parts by weight of the rubber matrix, the essential components comprise 1.5-10 parts of a crosslinking agent, 30-200 parts of a reinforcing filler, and 5-250 parts of a plasticizer, where the branched polyethylene has a degree of branching of not less than 50 branches/1000 carbon atoms, a weight average molecular weight of not less than 50,000, a Mooney viscosity ML(1+4) at 125° C. of not less than 2.

In the prior art, "branched polyethylene" refers to, in addition to an ethylene homopolymer having branches, a saturated vinyl copolymer having branches, for example, an ethylene-α-olefin copolymer, which may be POE. Although POE performs well in physical and mechanical properties and aging resistance, the cross-linking performances are less good. Therefore, although the branched polyethylene of the present invention can include both a branched ethylene homopolymer and POE, it is preferred that the branched polyethylene comprises a high proportion of or exclusively a branched ethylene homopolymer. In a preferred embodiment of the present invention, the branched polyethylene comprises exclusively a branched ethylene homopolymer.

In the further elaboration of the technical solution of the present invention, the branched polyethylene used is a branched ethylene homopolymer unless otherwise particularly specified.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method comprises mainly homopolymerizing ethylene following a "chain walking mechanism" in the presence of a late transition metal catalyst, where the late transition metal catalyst is preferably an (α-diimine)nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such branched polyethylene may have different numbers of carbon atoms, and specifically 1 to 6 or more carbon atoms.

The production cost of an (α-diimine) nickel catalyst is significantly lower than that of an (α-diimine) palladium catalyst, and the (α-diimine) nickel catalyst has a high rate and high activity in catalyzing the polymerization of ethylene, and is thus more suitable for industrial application. Therefore, in the present invention, an (α-diimine) nickel catalyst is preferably used in the production of branched polyethylene through catalytic polymerization of ethylene.

The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching is between that of POE and EPM, constituting a new technical solution that is different from the prior art. Therefore, the rubber matrix of present invention has both excellent aging resistance and good cross-linking performances.

The cross-linking performances include factors such as crosslinking density and crosslinking rate, and are the specific manifestations of the cross-linking ability of the rubber matrix in the processing process.

The branched polyethylene used in the present invention preferably has a methyl branch content of 40% or more or 50% or more, and has a similarity in structure with EPM. In terms of the crosslinking ability, the degree of branching (the content of tertiary carbon atom) and the steric hindrance around the tertiary carbon atom are the two main factors affecting the crosslinking ability of a saturated polyolefin. Compared with EPM, the branched polyethylene used in the present invention has a low degree of branching, and since the branched polyethylene has branches with the carbon number of not less than 2, the steric hindrance around the tertiary carbon atom of the branched polyethylene used in the present invention is theoretically greater than that of EPM. Taking the two factors into account, it can be inferred that the crosslinking ability of the branched polyethylene used in the present invention is weaker than that of EPM and further weaker than that of EPDM. However, the actual crosslinking ability of the partially branched polyethylene used in the present invention is close to, and can even be equal to or better than that of EPDM. This means that the rubber composition of the present invention can achieve a good aging resistance while the crosslinking ability is not weakened, and can even have excellent crosslinking performances to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a cross-linking reaction is more likely to occur. Having a secondary branch structure is a significant distinct of the branched polyethylene used in the preferred embodiment of the present invention from EPM or the conventional ethylene-α-olefin copolymer in the prior art.

It is a new technical solution to improve the crosslinking ability of a saturated polyolefin elastomer by using the secondary branch structure with lower steric hindrance. According to the technical solution of the present invention, it is also considered to be within the technical protection of the present invention to include a vinyl copolymer having a secondary branch structure or other saturated hydrocarbon polymers in the rubber matrix. The vinyl copolymer refers to a copolymer of ethylene with a branched α-olefin and has a secondary branch structure. The branched α-olefin may be selected from the group consisting of isobutene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, and 6-methyl-1-heptene, and the comonomer may also include a common linear α-olefin.

It is generally believed in the prior art that the branched polyethylene produced in the presence of an (α-diimine) nickel catalyst is difficult to have a secondary branch structure that is at least difficult to fully identify, and the technical solution of the present invention also provides a new idea for analyzing the structure of the branched polyethylene.

Compared with the ethylene-propylene rubber, when branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the main chains than the ethylene-propylene rubber, which can effectively avoid the concentration of stress, and contribute to better mechanical properties, including tear strength. Moreover, better crosslinking ability can effectively increase the crosslinking density, and the molecular weight distribution of the branched polyethylene is close to 2, which is narrower than a common ethylene-propylene rubber, so it is expected to obtain better compression set resistance.

In a further technical solution, the rubber composition comprises a rubber matrix and essential components. The rubber matrix comprises, in parts by weight, 100 parts of a branched polyethylene; and based on 100 parts by weight of the rubber matrix, the essential components comprise 2-7 parts of a crosslinking agent, 30-200 parts of a reinforcing filler, and 8-150 parts of a plasticizer.

In a further technical solution, the crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

In a further technical solution, the reinforcing filler comprises at least one of carbon black, silica, calcium carbonate, talc, calcined clay, magnesium silicate, and magnesium carbonate.

In a further technical solution, the plasticizer comprises at least one of pine tar, motor oil, naphthenic oil, paraffin oil, coumarone, RX-80, stearic acid, paraffin, liquid polyisobutene, a fatty acid derivative, and a mixture thereof. The plasticizer is further preferably used in an amount of 15-120 parts by weight. Stearic acid can also act as an active agent in a sulfur vulcanization-based system, and reacts with some metal oxides to form soluble salts, thereby increasing the activation of a promoter by metal oxides. Proper use of a plasticizer can increase the elasticity of the rubber compound and the plasticity suitable for process operation. In order to increase the adhesion, it is also preferred to use a tackifier such as pine tar, coumarone, RX-80, liquid polyisobutene and the like.

In a further technical solution, the rubber composition further comprises auxiliary components, which comprise, based on 100 parts by weight of the rubber matrix, 0.2 to 10 parts of an auxiliary crosslinking agent, 0.5 to 3 parts of a stabilizer, 2 to 15 parts of a metal oxide, and 0 to 3 parts of a vulcanization accelerator.

In a further technical solution, the auxiliary crosslinking agent comprises at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide, N,N'-bis(furfurylidene) acetone, 1,2-polybutadiene, paraquinonedioxime, sulfur, and a metal salt of an unsaturated carboxylic acid. The metal salt of an unsaturated carboxylic acid includes at least one of zinc acrylate, zinc methacrylate, magnesium methacrylate, calcium methacrylate, and aluminum methacrylate.

In a further technical solution, the metal oxide includes at least one of zinc oxide, magnesia, calcium oxide, lead monoxide, and lead tetroxide.

In a further technical solution, the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

In a further technical solution, the vulcanization accelerator comprises at least one of 2-mercaptobenzothiazole, dibenzothiazyl di sulfide, tetramethyl thiuram monosulfide, tetramethyl thiuram di sulfide, tetraethyl thiuram di sulfide, N-cyclohexyl-2-benzothiazole sulfenamide, N,N-dicyclohexyl-2-benzothiazole sulfenamide, bismaleimide, and ethylene thiourea.

In a further technical solution, the EPM and EPDM used have a Mooney viscosity ML (1+4) at 125° C. of 20-80, and an ethylene content of 45%-70%.

In a further technical solution, based on 100 parts by weight of the rubber matrix, the content of the branched polyethylene is A, in which 10≤A≤100 parts, the content of EPM and EPDM is B, in which 0≤B≤90 parts, where the branched polyethylene is an ethylene homopolymer having a degree of branching of 60-130 branches/1000 carbon atoms, a weight average molecular weight of 66,000-518,000, and a Mooney viscosity ML (1+4) at 125° C. of 6-102.

In a further technical solution, based on 100 parts by weight of the rubber matrix, the content of the branched polyethylene is A, in which 10≤A≤100 parts, the content of EPM and EPDM is B, in which 0≤B≤90 parts, where the branched polyethylene is an ethylene homopolymer having a degree of branching of 70-116 branches/1000 carbon atoms, a weight average molecular weight of 201,000-436,000, and a Mooney viscosity ML (1+4) at 125° C. of 23-101.

In a further technical solution, based on 100 parts by weight of the rubber matrix, the content of the branched polyethylene is A, in which 10≤A≤100 parts, the content of EPM and EPDM is B, in which 0≤B≤90 parts, where the branched polyethylene is an ethylene homopolymer having a degree of branching of 80-105 branches/1000 carbon atoms, a weight average molecular weight of 250,000-400,000, and a Mooney viscosity ML (1+4) at 125° C. of 40-95.

In a further technical solution, based on 100 parts by weight of the rubber matrix, the content of the branched polyethylene is A, in which 10≤A≤100 parts, the content of EPM and EPDM is B, in which 0≤B≤90 parts, where the branched polyethylene is an ethylene homopolymer having a degree of branching of 80-105 branches/1000 carbon atoms, a weight average molecular weight of 268,000-356,000, and a Mooney viscosity ML (1+4) at 125° C. of 42-80.

In a further technical solution, a third monomer of EPDM is preferably a diene monomer, particularly selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylidene-2-norbornene, 1,5-cyclooctadiene, 1,4-cyclooctadiene, and the like. In particular, the ethylene-propylene rubber may contain two or more diene monomers, for example, 5-ethylidene-2-norbornene and 5-vinyl-2-norbornene. The functional group of the diene monomer can function as an intrinsic auxiliary crosslinking agent in the peroxide vulcanization to improve the crosslinking efficiency. This reduces the amount and residue of the crosslinking agent and the auxiliary crosslinking agent required and the cost when they are added. The content in percentages by weight of the diene monomer relative to the ethylene-propylene rubber is preferably from 1% to 14%, more preferably from 3% to 10%, and further preferably from 4% to 7%.

In an embodiment of the present invention, in order to improve the adhesion of the rubber compound, the rubber composition may further comprise a tackifier. The pine tar, coumarone resin, RX-80, and liquid polyisobutene mentioned above for the plasticizer also have a tackifying effect. The liquid coumaroneresin has a better tackifying effect than that of a solid coumaroneresin. The tackifier can also be selected from the group consisting of C5 petroleum resin, C9 petroleum resin, hydrogenated rosin, terpene resin, alkyl phenolic resin, modified alkyl phenolic resin, alkylphenolacetylene resin, and other commonly used tackifiers. The tackifier is usually used in an amount of not more than 30 parts by weight, further preferably not more than 10 parts by weight, and further preferably not more than 5 parts by weight, based on 100 parts by weight of the rubber matrix.

The crosslinking agent, the auxiliary crosslinking agent and the vulcanization accelerator involved in the rubber composition provided in the present invention all belong to a crosslinking system.

The rubber composition of the present invention may be present in the form of an uncrosslinked rubber mix, and may be present in the form of a vulcanized rubber after a further crosslinking reaction. The vulcanized rubber may also be simply referred to as a vulcanizate.

The present invention also provides a processing method for obtaining the rubber composition, which comprises the following steps:
(1) rubber mixing, comprising setting the temperature and the rotor speed of an internal mixer, adding other components than the crosslinking system in the rubber composition sequentially to the internal mixer and mixing; then adding the crosslinking system, mixing, and discharging; and plasticating the rubber mix on an open mill, unloading the sheet, and standing, where the crosslinking system includes a crosslinking agent, and also at least one of an auxiliary crosslinking agent and a vulcanization accelerator; and
(2) vulcanization, comprising: filling the stood rubber mix into a cavity of a preheated mold, vulcanizing by pressing at a high temperature, and releasing from the mold after the vulcanization is completed, to obtain a vulcanized rubber. In order to improve the compression set resistance of the vulcanized rubber, a post vulcanization process can be further used for vulcanization.

The present invention also provides a plate-type rubber support of bridge, which comprises a steel plate and a rubber sheet comprising a rubber composition as described above.

The present invention also provides a plate-type rubber support of bridge, which comprises a steel plate, a polytetrafluoroethylene plate, and a rubber sheet comprising a rubber composition as described above.

The present invention also provides a method for producing a plate-type rubber support of bridge by bonding the rubber sheet, the steel plate and the polytetrafluoroethylene plate together as a whole by coating an adhesive, pressing and vulcanizing. The production method comprises the following steps:
(1) rubber mixing process, comprising setting the temperature and the rotor speed of an internal mixer, adding other components than the crosslinking system in the rubber composition used in the rubber sheet sequentially to the internal mixer and mixing; then adding the crosslinking system, mixing, and discharging; plasticating the rubber mix on an open mill, unloading the sheet, standing, and inspecting; numbering, remilling, and calendaring the discharged sheet, and punching into a semi-finished rubber sheet of desired specification, for use in the vulcanization procedure, wherein the crosslinking system comprises a crosslinking agent, and also at least one of an auxiliary crosslinking agent and a vulcanization accelerator;
(2) vulcanization process, comprising: sequentially laminating the rubber sheet, and the steel plate and the polytetrafluoroethylene plate that are surface treated and coated with an adhesive according to the process requirements, then filling into a preheated mold, and vulcanizing and molding on a press vulcanizer; and
(3) post-treatment, comprising: after vulcanization, pulling out and disassembling the mold, removing the finished rubber support product, cooling, standing and trimming to obtain the finished product.

The present invention also provide a basin type rubber support of bridge, which has a rubber bearing plate comprising a rubber composition as described above.

The present invention also provides a method for producing a basin-type rubber support. The basin-type rubber support is assembled with an upper support plate, a stainless steel plate, a polytetrafluoroethylene plate, an intermediate steel plate, a sealing ring, a rubber bearing plate, a lower support plate, and an anchor of the support. The production method includes the following steps:
(1) rubber mixing process, comprising setting the temperature and the rotor speed of an internal mixer, adding other components than the crosslinking system in the rubber composition used in the rubber bearing plate sequentially to the internal mixer and mixing; then adding the crosslinking system, mixing, and discharging; and plasticating the rubber mix on an open mill, unloading the sheet, standing, and inspecting, where the crosslinking system includes a crosslinking agent, and also at least one of an auxiliary crosslinking agent and a vulcanization accelerator;
(2) vulcanization molding process, comprising: filling the rubber sheet into a preheated mold, and vulcanizing on a press vulcanizer;
(3) post-treatment, comprising: after vulcanization, pulling out and disassembling the mold, removing the finished rubber support product, cooling, standing and trimming to obtain a rubber bearing sheet; and
(4) assembling, comprising: assembling the rubber bearing plate with other components, to obtain a basin-type rubber support.

The present invention also provides a rubber expansion and contraction installation for bridge, which has a rubber expansion and contraction body comprising a rubber composition as described above.

The present invention further provides a method for producing a rubber expansion and contraction installation for bridge, where the rubber expansion and contraction body is produced through an extrusion method comprising the following steps:
- (1) rubber mixing process, comprising setting the temperature and the rotor speed of an internal mixer, adding other components than the crosslinking system in the rubber composition sequentially to the internal mixer and mixing; then adding the crosslinking system, mixing, and discharging; and plasticating the rubber mix on an open mill, unloading the sheet, standing, and inspecting, where the crosslinking system includes a crosslinking agent, and also at least one of an auxiliary crosslinking agent and a vulcanization accelerator;
- (2) extrusion and vulcanization, comprising: using an evacuation extruder in the extrusion and vulcanization process, and after the extrusion, performing a salt bath vulcanization process, and obtaining a vulcanized rubber after spraying, steeping, steeping pressing, and cooling; and
- (3) trimming, and inspecting, to obtain a finished product.

The present invention further provides a method for producing a rubber expansion and contraction installation for bridge, where the rubber expansion and contraction body is produced through a molding method comprising specifically the following steps:
- (1) rubber mixing and forming, comprising setting the temperature and the rotor speed of an internal mixer, adding other components than the crosslinking system in the rubber composition sequentially to the internal mixer and mixing; then adding the crosslinking system, mixing, and discharging; plasticating the rubber mix on an open mill, unloading the sheet, standing, and inspecting; and remilling the discharged sheet, weighing, and forming, where the crosslinking system includes a crosslinking agent, and also at least one of an auxiliary crosslinking agent and a vulcanization accelerator;
- (2) molding vulcanization, comprising: placing the formed rubber mix into a mold, and vulcanizing by a high-temperature steam vulcanization process; and
- (3) cooling, trimming, and inspecting, to obtain a finished product.

The present invention also provides a rubber/steel plate composite expansion and contraction installation, which has a rubber expansion and contraction body comprising a rubber composition as described above.

The present invention further provides a method for producing a rubber expansion and contraction installation for bridge, which comprises the following steps:
- (1) rubber mixing and forming, comprising setting the temperature and the rotor speed of an internal mixer, adding other components than the crosslinking system in the rubber composition sequentially to the internal mixer and mixing; then adding the crosslinking system, mixing, and discharging; plasticating the rubber mix on an open mill, unloading the sheet, standing, and inspecting; and remilling the discharged sheet, weighing, and forming, where the crosslinking system includes a crosslinking agent, and also at least one of an auxiliary crosslinking agent and a vulcanization accelerator;
- (2) vulcanization process, comprising: laminating the rubber sheet and a steel plate that is surface treated and coated with an adhesive according to the process requirements, then filling into a preheated mold, and vulcanizing by heating and pressing on a press vulcanizer; and
- (3) post-treatment, comprising: after vulcanization, pulling out and disassembling the mold, removing the product, cooling, standing and trimming to obtain the finished product.

The present invention also provides a rubber railway pad, in which the rubber compound used comprises a rubber composition as described above.

The present invention further provides a method for producing a rubber railway pad, which comprises the following steps:
- (1) rubber mixing and forming, comprising: setting the temperature and the rotor speed of an internal mixer, adding other components than the crosslinking system in the rubber composition sequentially to the internal mixer and mixing; then adding the crosslinking system, mixing, and discharging; standing, inspecting, hot milling, discharging the sheet according to the desired thickness, and cutting to have the desired specification and shape, for use in the vulcanization process, where the cross-linking system comprises a crosslinking agent, and also at least one of an auxiliary crosslinking agent and a vulcanization accelerator;
- (2) vulcanization, comprising: putting the cut rubber into a mold, placing the mold onto a press vulcanizer, and vulcanizing by heating and pressing; and
- (3) post-treatment, comprising: after vulcanization, pulling out and disassembling the mold, removing the product, cooling, standing and trimming to obtain the finished product.

The present invention also provides a rubber fender, in which the rubber compound used comprises a rubber composition as described above.

The present invention further provides a method for producing a rubber fender, which comprises the following steps:
- (1) rubber mixing, comprising: setting the temperature and the rotor speed of an internal mixer, adding other components than the crosslinking system in the rubber composition sequentially to the internal mixer and mixing; then adding the crosslinking system, mixing, and discharging, where the crosslinking system comprises a crosslinking agent, and also at least one of an auxiliary crosslinking agent and a vulcanization accelerator;
- (2) molding and vulcanization, comprising: feeding the rubber mix to a mold cavity, mold closing, flowing the rubber compound fully, venting, mold closing, and vulcanizing; and
- (3) mold opening, removing the product, trimming, and inspecting to obtain a finished product.

The present invention also provides a rubber water stop, in which the rubber compound used comprises a rubber composition as described above.

The present invention further provides a method for producing a rubber water stop, which comprises the following steps:
- (1) rubber mixing and forming, comprising setting the temperature and the rotor speed of an internal mixer, adding other components than the crosslinking system in the rubber composition sequentially to the internal mixer and mixing; then adding the crosslinking system, mixing, and discharging; plasticating the rubber mix on an open mill, unloading the sheet, standing, and inspecting; and remilling the discharged sheet, weighing, and forming, where the crosslinking system includes a crosslinking agent, and also at least one of an auxiliary crosslinking agent and a vulcanization accelerator;

(2) vulcanization, comprising: putting the cut rubber into a mold, placing the mold onto a press vulcanizer, and vulcanizing by heating and pressing; and (3) post-treatment, comprising: after vulcanization, pulling out and disassembling the mold, removing the product, cooling, standing and trimming to obtain the finished product.

The present invention also provides a steel-edge rubber water stop, in which the rubber compound used comprises a rubber composition as described above.

The present invention further provides a method for producing a steel-edge rubber water stop, which comprises the following steps:

(1) rubber mixing and forming, comprising setting the temperature and the rotor speed of an internal mixer, adding other components than the crosslinking system in the rubber composition sequentially to the internal mixer and mixing; then adding the crosslinking system, mixing, and discharging; plasticating the rubber mix on an open mill, unloading the sheet, standing, and inspecting; and remilling the discharged sheet, weighing, and forming, where the crosslinking system includes a crosslinking agent, and also at least one of an auxiliary crosslinking agent and a vulcanization accelerator;

(2) vulcanization, comprising: laminating the rubber sheet and a thin steel plate that is surface treated and coated with an adhesive according to the process requirements, then filling into a preheated mold, and vulcanizing by heating and pressing on a press vulcanizer; and (3) post-treatment, comprising: after vulcanization, pulling out and disassembling the mold, removing the product, cooling, standing and trimming to obtain the finished product.

The present invention also provides a vehicle shock-absorbing support, in which the rubber compound used comprises a rubber composition as described above.

The present invention further provides a method for producing a vehicle shock-absorbing support, which comprises the following steps:

(1) rubber mixing and forming, comprising setting the temperature and the rotor speed of an internal mixer, adding other components than the crosslinking system in the rubber composition sequentially to the internal mixer and mixing; then adding the crosslinking system, mixing, and discharging; plasticating the rubber mix on an open mill, unloading the sheet, standing, and inspecting; and remilling the discharged sheet, weighing, and forming, where the crosslinking system includes a crosslinking agent, and also at least one of an auxiliary crosslinking agent and a vulcanization accelerator;

(2) vulcanization, comprising: laminating the rubber sheet and a metal piece that is surface treated and coated with an adhesive according to the process requirements, then filling into a preheated mold, and vulcanizing by heating and pressing on a press vulcanizer; and (3) post-treatment, comprising: after vulcanization, pulling out and disassembling the mold, removing the product, cooling, standing and trimming to obtain the finished product.

The present invention also provides a rubber roller, in which the rubber compound used comprises a rubber composition as described above.

The present invention further provides a method for producing a rubber roller, which comprises the following steps:

(1) rubber mixing, comprising setting the temperature and the rotor speed of an internal mixer, adding other components than the crosslinking system in the rubber composition sequentially to the internal mixer and mixing; then adding the crosslinking system, mixing, and discharging; and plasticating the rubber mix on an open mill, unloading the sheet, standing, and inspecting, where the crosslinking system includes a crosslinking agent, and also at least one of an auxiliary crosslinking agent and a vulcanization accelerator;

(2) winding and wrapping, comprising: feeding the rubber mix to a screw extruder, extruding a rubber sheet with a thickness and width required by the process, after the rubber sheet is uniform, starting the rotating wrapping machine to wind the rubber sheet onto a ready-to-use metal roller core, winding and wrapping the rubber layer by layer until the thickness at the wrapped single side reaches the specified thickness, and then winding 2-3 layers of nylon cure wrapping tape on the rubber surface to obtain a wrapped rubber roller;

(3) vulcanization by a vulcanization tank, comprising sending the wrapped rubber roller to a vulcanization tank, closing the tank, and vulcanizing by introducing steam to the vulcanization tank, during which the compressed air valve is opened to introduce compressed air, such that the pressure in the vulcanization tank reaches 4.5-5 atmospheres in 0.5 h, where the vulcanization procedure comprises heating to 70-80° C. and heat preserving for 2 h; then heating to 100-110° C. and heat preserving for 0.5 h; next heating to 120-130° C. and heat preserving for 0.5 h; then heating to 135-140° C. and heat preserving for 8-10 h; after vulcanization opening the vent valve to reduce the pressure, opening the safety pin when the pressure gauge points to zero, then half opening the vulcanization tank when the steam is emitted and escapes from the pin hole to allow the temperature to decrease, and pulling out the rubber roller when the temperature inside the tank is lower than 60° C. or equivalent to the room temperature; and (4) post-treatment, comprising: roughly machining the vulcanized rubber roller on a lathe, then finishing on a grinding machine, and inspecting to obtain a finished product.

The present invention also provides a high temperature-resistant ribbed belt comprising a compression layer and a buffer layer, in which the rubber compound used in the buffer layer comprises a rubber composition as described above.

The present invention further provides a method for producing a high temperature-resistant ribbed belt, which comprises the following steps:

(1) rubber mixing, comprising mixing the rubber compound used in the buffer layer by setting the temperature and the rotor speed of an internal mixer, adding other components than the crosslinking system in the rubber composition sequentially to the internal mixer and mixing; then adding the crosslinking system, mixing, and discharging; and plasticating the rubber mix on an open mill, unloading the sheet, standing, and inspecting, where the crosslinking system includes a crosslinking agent, and also at least one of an auxiliary crosslinking agent and a vulcanization accelerator;
(2) molding by a reverse molding method, comprising: mounting a blank mold on a forming machine, cleaning the mold, applying a small amount of release agent, attaching a top cloth of the ribbed belt to the blank mold after volatilization, then attaching the buffer layer rubber sheet, correcting the tension of the string, flatly winding the strength layer, then attaching the buffer rubber again, and finally attaching the ribbed rubber to the outer circumference required by the molding process to obtain a belt blank;
(3) vulcanization by a rubber jacket vulcanization process, comprising sending the belt blank to a vulcanization tank for vulcanization, wherein the vulcanization temperature is 155-175° C., the internal pressure is 0.45-0.55 MPa, the external pressure is 1.0-1.2 MPa, and the vulcanization time is 25-30 minutes; and
(4) post-treatment, comprising: after the vulcanization is completed, cooling, releasing the belt roll from the mold, sending the belt roll to a cutting procedure, cutting according to the required width, rubbing the back side, rubbing the ribs, trimming, and inspecting, to obtain a finished product.

The present invention also provides a windshield wiper, in which the rubber compound used comprises a rubber composition as described above.

The present invention further provides a method for producing a windshield wiper, which comprises the following steps:
(1) rubber mixing, comprising setting the temperature and the rotor speed of an internal mixer, adding other components than the crosslinking system in the rubber composition sequentially to the internal mixer and mixing; then adding the crosslinking system, mixing, and discharging; and plasticating the rubber mix on an open mill, unloading the sheet, standing, and inspecting, wherein the crosslinking system comprises a crosslinking agent, and also at least one of an auxiliary crosslinking agent and a vulcanization accelerator;
(2) vulcanization, comprising: injecting the rubber mix into a mold cavity, and vulcanizing and molding at a high temperature under a high pressure; and
(3) post-treatment, comprising: subjecting the vulcanized product to surface treatment and inspecting to obtain a finished product.

The present invention also provides a sealing ring, where the rubber compound used comprises the above rubber composition.

The present invention further provides a method for producing a sealing ring, which comprises the following steps:
(1) rubber mixing and forming, comprising setting the temperature and the rotor speed of an internal mixer, adding other components than the crosslinking system in the rubber composition sequentially to the internal mixer and mixing; then adding the crosslinking system, mixing, and discharging; and plasticating the rubber mix on an open mill, unloading the sheet, inspecting, remilling the rubber compound, and then extruding to obtain a semi-finished product, where the crosslinking system includes a crosslinking agent, and also at least one of an auxiliary crosslinking agent and a vulcanization accelerator; and
(2) vulcanization, comprising stage I molding vulcanization for 20-25 min at a temperature of 155-170° C., and stage II oven vulcanization for 40-80 min at a temperature of 145-155° C.

The present invention also provides a waterproof coil, in which the rubber compound used comprises a rubber composition as described above.

The present invention further provides a method for producing a waterproof coil, which comprises the following steps:
(1) rubber mixing, comprising setting the temperature and the rotor speed of an internal mixer, adding other components than the crosslinking system in the rubber composition sequentially to the internal mixer and mixing; then adding the crosslinking system, mixing, and discharging; and thoroughly plasticating and mixing the rubber mix on an open mill, to obtain a sheet of well mixed rubber compound, cooling to below 50° C., discharging the sheet, and stacking, where the crosslinking system includes a crosslinking agent, and also at least one of an auxiliary crosslinking agent and a vulcanization accelerator; and
(2) hot milling, comprising: hot milling the sheet of well mixed rubber compound on an open mill until the rubber sheet is smooth and even, and then preliminarily rolling the rubber sheet up;
(3) calendering, comprising: placing the rubber sheet that is hot milled and preliminarily rolled up on a calender, calendering with a roll gap adjusted according to the thickness requirement of the finished product, to obtain a semi-finished coil meeting the requirement of the thickness specification of the finished product;
(4) rolling, comprising: sandwiching an isolation liner layer according to the requirement of the length specification of the finished coiled sheet and rolling up the semi-finished coil;
(5) vulcanization, comprising: vulcanizing the coil in a nitrogen-filled vulcanizer, where the temperature in the vulcanizer is controlled to 155-165° C., the pressure is controlled to 20-25 MPa, and the vulcanization time is 25 to 30 min; and
(6) re-rolling, comprising: unfolding the vulcanized coil, removing the isolation liner layer, re-rolling, and packaging into a product.

The present invention also provides a sealing strip, where the rubber compound used comprises a rubber composition as described above. The rubber sealing strip provided in the present invention can be used as a plate-type rubber sealing strip for a radiator of an engine cooling system.

The present invention also provides a method for producing a sealing strip, in which molding vulcanization and vulcanization in stages are used. The method comprises the following steps.
(1) rubber mixing, comprising setting the temperature and the rotor speed of an internal mixer, adding other components than the crosslinking system in the rubber composition sequentially to the internal mixer and mixing; then adding the crosslinking system, mixing, and discharging; and plasticating the rubber mix on an open mill, unloading the sheet, standing, and inspecting, wherein the crosslinking system comprises a crosslinking agent, and also at least one of an auxiliary crosslinking agent and a vulcanization accelerator;
(2) extrusion molding the rubber mix inspected qualified by an extruder, cutting, placing in a mold of a vulcanization apparatus, and subjecting to stage I vulcanization at a high temperature under a high pressure, the pressure is preferably 14 to 16 MPa, the temperature is preferably 170 to 185° C., and the vulcanization time is preferably 2 to 3 minutes;

(3) trimming the vulcanized product;

(4) subjecting the trimmed product to stage II vulcanization at a high temperature, where the temperature is preferably 165 to 175° C., and the time is preferably 25 to 35 minutes; and (5) inspecting the product and storing after being inspected qualified.

The present invention also provides an inner tire, in which the rubber compound used in the carcass comprises a rubber composition as described above.

The present invention also provides a method for producing an inner tire, comprising the steps of: mixing the rubber, straining, and standing; then extruding through an extruder, cutting according to the length required by the process, sticking the inflating valve, splicing, and standing; then inflation forming, steam vulcanizing, cooling, inspecting, and trimming to obtain a finished product.

The present invention has the following beneficial effects. A new rubber composition is provided, in which branched polyethylene is used to replace a part or all of the ethylene-propylene rubber. The new rubber composition is used in rubber products requiring high aging resistance and/or compression set resistance, such that good heat resistance, compression set resistance and mechanical strength can be obtained after peroxide vulcanization. The principle is that since the molecular structure of branched polyethylene is completely saturated, the heat aging resistance is similar to that of EPM, and superior to that of EPDM; and a peroxide vulcanization system can be used. Moreover, since branched polyethylene has more branches on its molecular structure, and the branches has a certain length distribution. When the branched polyethylene could have a proper number of secondary branch structures, the crosslinking point of the branched polyethylene could be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the main chains than the ethylene-propylene rubber, which are similar to the polysulfide linkage distribution in the sulfur vulcanization system, and by which the concentration of stress can be effectively avoided, thus facilitating the obtaining of better mechanical performances.

The compression set resistance correlates with the molecular weight distribution of the rubber material. The rubber with narrow molecular weight distribution has relatively low compression set. The molecular weight distribution of ethylene-propylene rubber is mostly between 3 and 5, and is as high as 8-9 sometimes. A few ethylene-propylene rubbers have a molecular weight distribution close to 2, and are convenient in processing, but the cost is high. The molecular weight distribution of branched polyethylene is narrow, and generally lower than 2.5, which is significantly smaller than the molecular weight distribution of ordinary ethylene-propylene rubbers. Therefore, the rubber composition of the present invention has a lower compression set after vulcanization.

DETAILED DESCRIPTION

The following examples are given to further illustrate the present invention, and not intended to limit the scope of the present invention. Some non-essential improvements and modifications made by the skilled person in the art based on the disclosure herein are still within the scope of the present invention.

Specific embodiments of the rubber composition provided in the present invention are as follows.

A rubber composition is provided, which comprises a rubber matrix and essential components. The rubber matrix comprises, in parts by weight, A parts of a branched polyethylene, in which $0<a\leq100$ parts, and B parts of an ethylene-propylene rubber, in which $0\leq b<100$ parts; and the essential components comprise 1.5-10 parts of a crosslinking agent, 30-200 parts of a reinforcing filler, and 5-250 parts of a plasticizer. The branched polyethylene has a degree of branching of not less than 50 branches/1000 carbon atoms, a weight average molecular weight of not less than 50,000, and a Mooney viscosity ML (1+4) at 125° C. of not less than 2.

In a further preferred embodiment, the rubber composition comprises a rubber matrix and essential components. The rubber matrix comprises, in parts by weight, 100 parts of a branched polyethylene; and based on 100 parts by weight of the rubber matrix, the essential components comprise 2-7 parts of a crosslinking agent, 30-200 parts of a reinforcing filler, and 8-150 parts of a plasticizer.

In this embodiment, the crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-di methyl-2,5-di(tert-butyl peroxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate. The reinforcing filler comprises at least one of carbon black, silica, calcium carbonate, talc, calcined clay, magnesium silicate, and magnesium carbonate. The plasticizer comprises at least one of pine tar, motor oil, naphthenic oil, paraffin oil, coumarone, RX-80, stearic acid, paraffin, liquid polyisobutene, a fatty acid derivative, and a mixture thereof.

The rubber composition further comprises auxiliary components, which comprise 0.2 to 10 parts of an auxiliary crosslinking agent, 0.5 to 3 parts of a stabilizer, 2 to 15 parts of a metal oxide, and 0 to 3 parts of a vulcanization accelerator. The auxiliary crosslinking agent comprises at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide, N,N'-bis(furfurylidene) acetone, 1,2-polybutadiene, paraquinonedioxime, sulfur, zinc acrylate, zinc methacrylate, magnesium methacrylate, calcium methacrylate, and aluminum methacrylate.

The metal oxide includes at least one of zinc oxide, magnesia, calcium oxide, lead monoxide, and lead tetroxide.

The stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB). The vulcanization accelerator comprises at least one of 2-mercaptobenzothiazole, dibenzothiazyl disulfide, tetramethyl thiuram monosulfide, tetramethyl thiuram di sulfide, tetraethyl thiuram di sulfide, N-cyclohexyl-2-benzothiazole sulfenamide, N,N-dicyclohexyl-2-benzothiazole sulfenamide, bismaleimide, and ethylene thiourea.

The crosslinking system includes a crosslinking agent, and also at least one of an auxiliary crosslinking agent and a vulcanization accelerator.

The EPM used preferably has a Mooney viscosity ML (1+4) at 125° C. of 20-50 and preferably has an ethylene content of 45%-60%.

The EPDM used preferably has a Mooney viscosity ML (1+4) at 125° C. of 20 to 100 and further preferably 20 to 80, and preferably has an ethylene content of 50% to 75%. The third monomer is 5-ethylidene-2-norbornene, 5-vinyl-2-norbornene or dicyclopentadiene, and the content of the third monomer is 1%-7%.

The branched polyethylene can be obtained by the catalytic homopolymerization of ethylene in the presence of an (α-diimine) nickel catalyst and a cocatalyst. The structure of the (α-diimine) nickel catalyst used, the synthesis method and the method for preparing branched polyethylene therewith are disclosed in the prior art, as described in, without limitation, CN102827312A, CN101812145A, CN101531725A, CN104926962A, U.S. Pat. Nos. 6,103,658, and 6,660,677.

The branched polyethylene has a degree of branching of 60-130 branches/1000 carbon atoms, a weight average molecular weight of 66,000-518,000, and a Mooney viscosity ML (1+4) at 125° C. of 6-102. The degree of branching is measured by $^1H$ NMR, and the molar percentages of various branches are measured by $^{13}C$ NMR.

The details are shown in a table below:

| Branched polyethylene No. | Degree of branching | Methyl content/% | Ethyl content/% | Propyl content/% | Butyl content/% | Pentyl content/% | Content of hexyl and higher branches/% | Weight average molecular weight/ 10,000 | Molecular weight distribution | Mooney viscosity ML(1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 112 | 52.4 | 16.2 | 7.6 | 5.6 | 4.9 | 13.3 | 22.5 | 1.9 | 32 |
| PER-4 | 105 | 54.0 | 13.7 | 6.4 | 5.3 | 5.1 | 15.5 | 26.8 | 2.1 | 42 |
| PER-5 | 102 | 56.2 | 12.9 | 6.2 | 5.2 | 4.9 | 14.6 | 27.9 | 2.1 | 52 |
| PER-6 | 99 | 59.6 | 11.6 | 5.8 | 4.9 | 5.1 | 13.0 | 28.3 | 1.8 | 63 |
| PER-7 | 90 | 62.1 | 9.4 | 5.4 | 4.6 | 4.5 | 14.0 | 32.1 | 2.1 | 77 |
| PER-8 | 82 | 64.2 | 8.7 | 5.3 | 4.2 | 3.9 | 13.7 | 35.6 | 1.7 | 80 |
| PER-9 | 70 | 66.5 | 7.2 | 4.6 | 3.2 | 3.2 | 15.3 | 43.6 | 2.1 | 93 |
| PER-10 | 60 | 68.1 | 7.1 | 4.2 | 2.7 | 2.8 | 15.1 | 51.8 | 2.2 | 102 |
| PER-11 | 87 | 61.8 | 10.3 | 5.4 | 4.6 | 4.9 | 12.0 | 40.1 | 1.8 | 101 |
| PER-12 | 94 | 60.5 | 10.8 | 5.7 | 4.7 | 4.9 | 13.3 | 37.8 | 2.0 | 85 |
| PER-13 | 102 | 56.8 | 12.7 | 6.1 | 5.2 | 5.1 | 13.9 | 34.8 | 1.9 | 66 |

Test Methods of Rubber Performances

1. Hardness test: The test is carried out using a hardness tester at room temperature in accordance with the national standard GB/T 531.1-2008.

2. Tensile strength and elongation at break performance test: The test is carried out with a type 2 dumbbell specimen using an electronic tensile tester at a tensile speed of 500 mm/min and a test temperature of 23±2° C. in accordance with the national standard GB/T528-2009.

3. Tear strength test: The test is carried out with a right-angled specimen using an electronic tensile tester at a tensile speed of 500 mm/min and a test temperature of 23±2° C. in accordance with the national standard GB/T529-2008.

4. Compression set resistance test: The test is carried out with a Type B specimen using a compression set tester in accordance with the national standard GB/T7759-1996, where the compression rate is 25%, and the test temperature is 70° C.

5. Mooney viscosity test: The test is carried out in accordance with the national standard GB/T1232.1-2000, with a Mooney viscosity meter at a test temperature of 125° C. by preheating for 1 minute, and the test is continued for 4 minutes.

6. Hot air accelerated aging test: The test is carried out in a heat aging test chamber at 150° C. for 72 h in accordance with the national standard GB/T3512-2001.

7. Test of optimum vulcanization time Tc90: The test is carried out at 160° C. in a rotorless vulcanizer in accordance with the national standard GB/T16584-1996.

The vulcanization conditions in the following Examples 1 to 29 and Comparative Examples 1 and 6 include temperature: 160° C.; pressure: 16 MPa; and time Tc90+2 min.

Some of the application areas in which the rubber composition provided in the present invention can be used will be disclosed in the following examples, and the properties of the vulcanized rubber produced with the rubber composition are tested and analyzed.

Example 1

Branched polyethylene No. PER-6 was used.

The processing steps of the rubber composition were as follows.

(1) Mixing: The temperature of the internal mixer was set to 90° C., and the rotor speed was set to 50 rpm. 50 parts of EPDM and 50 parts of branched polyethylene were added, prepressed and mixed for 90 seconds. 5 parts of zinc oxide and 1 part of stearic acid were then added, and mixed for 1 min. Then 50 parts of carbon black N330, and 5 parts of paraffin oil SUNPAR2280 were added, and mixed for 3 min. Finally, 3 parts of the crosslinking agent dicumyl peroxide (DCP), 5 parts of the auxiliary crosslinking agent zinc methacrylate and 0.2 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The rubber composition in this example can be used as a rubber compound for a rubber sheet of a plate-type support of bridge.

Example 2

Branched polyethylene No. PER-6 was used.
The processing steps of the rubber composition were as follows.

(1) Mixing: The temperature of the internal mixer was set to 90° C., and the rotor speed was set to 50 rpm. 100 parts of branched polyethylene was added, prepressed and mixed for 90 seconds. 5 parts of zinc oxide and 1 part of stearic acid were added and mixed for 1 min. Then 50 parts of carbon black N330, and 5 parts of paraffin oil SUNPAR2280 were added, and mixed for 3 min. Finally, 3 parts of the crosslinking agent dicumyl peroxide (DCP), 5 parts of the auxiliary crosslinking agent zinc methacrylate and 0.2 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparative Example 1

The processing steps were as follows.
(1) Mixing: The temperature of the internal mixer was set to 90° C., and the rotor speed was set to 50 rpm. 100 parts of EPDM was added, prepressed and mixed for 90 seconds. 5 parts of zinc oxide and 1 part of stearic acid were then added, and mixed for 1 min. Then 50 parts of carbon black N330, and 5 parts of paraffin oil SUNPAR2280 were added, and mixed for 3 min. Finally, 3 parts of the crosslinking agent dicumyl peroxide (DCP), 5 parts of the auxiliary crosslinking agent zinc methacrylate and 0.2 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 3

Branched polyethylene No. PER-5 was used.
The processing steps of the rubber composition were as follows.
(1) Mixing: The temperature of the internal mixer was set to 90° C., and the rotor speed was set to 50 rpm. 70 parts of EPDM and 30 parts of branched polyethylene were added, prepressed and mixed for 90 seconds. 5 parts of zinc oxide, and 1 part of stearic acid were then added, and mixed for 1 min. Then 65 parts of carbon black N330, and 5 parts of paraffin oil SUNPAR2280 were added, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 4

Branched polyethylene No. PER-5 was used.
The processing steps of the rubber composition were as follows.
(1) Mixing: The temperature of the internal mixer was set to 90° C., and the rotor speed was set to 50 rpm. 20 parts of EPM, 30 parts of EPDM and 50 parts of branched polyethylene were added, prepressed and mixed for 90 seconds. 5 parts of zinc oxide, and 1 part of stearic acid were then added, and mixed for 1 min. Then 65 parts of carbon black N330, and 5 parts of paraffin oil SUNPAR2280 were added, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 5

Branched polyethylene No. PER-5 was used.
The processing steps of the rubber composition were as follows.
(1) Mixing: The temperature of the internal mixer was set to 90° C., and the rotor speed was set to 50 rpm. 30 parts of EPDM and 70 parts of branched polyethylene were added, prepressed and mixed for 90 seconds. 5 parts of zinc oxide, and 1 part of stearic acid were then added, and mixed for 1 min. Then 65 parts of carbon black N330, and 5 parts of paraffin oil SUNPAR2280 were added, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparative Example 2

EPDM was used as the rubber matrix.
The processing steps were as follows.
(1) Mixing: The temperature of the internal mixer was set to 90° C., and the rotor speed was set to 50 rpm. 100 parts of EPDM were added, prepressed and mixed for 90 seconds. 5 parts of zinc oxide, and 1 part of stearic acid were then added, and mixed for 1 min. Then 65 parts of carbon black N330, and 5 parts of paraffin oil SUNPAR2280 were added, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The performance test data of Examples 1 to 5 and Comparative Examples 1 and 2 are shown in a table below.

| Test Item | Example 1 | Example 2 | Comparative Example 1 | Example 3 | Example 4 | Example 5 | Comparative Example 2 |
|---|---|---|---|---|---|---|---|
| Hardness | 63 | 62 | 63 | 62 | 61 | 62 | 62 |
| Tensile strength/MPa | 21.8 | 23.1 | 19.3 | 18.9 | 19.7 | 21.8 | 17.5 |

-continued

| Test Item | Example 1 | Example 2 | Comparative Example 1 | Example 3 | Example 4 | Example 5 | Comparative Example 2 |
|---|---|---|---|---|---|---|---|
| Elongation at break % | 421 | 432 | 392 | 493 | 489 | 511 | 502 |
| Compression set (at 70° C. for 22 h) | 11 | 9 | 13 | 19 | 18 | 16 | 21 |
| After aging (at 150° C. for 72 h) | | | | | | | |
| Hardness | 65 | 65 | 66 | 63 | 62 | 62 | 63 |
| Retention rate of tensile strength/% | 106 | 104 | 107 | 107 | 106 | 106 | 109 |
| Retention rate of elongation at break/% | 96 | 96 | 95 | 92 | 94 | 95 | 92 |

Example 6

A rubber expansion and contraction installation for bridge was produced by extrusion, which had a rubber expansion and contraction body with EPDM and branched polyethylene as the rubber matrix, in which the branched polyethylene used was PER-10.

The rubber compound used in the rubber expansion and contraction body was processed through the following steps.

(1) Mixing: The temperature of the internal mixer was set to 90° C., and the rotor speed was set to 50 rpm. 90 parts of EPDM and 10 parts of branched polyethylene were added, prepressed and mixed for 90 seconds. 5 parts of zinc oxide, 7 parts of calcium oxide and 1 part of stearic acid were then added, and mixed for 1 min. Then 90 parts of carbon black N550, 15 parts of calcium carbonate and 60 parts of paraffin oil SUNPAR2280 were added, and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 7

Branched polyethylene No. PER-9 was used.

The processing steps of the rubber composition were as follows.

(1) Mixing: The temperature of the internal mixer was set to 90° C., and the rotor speed was set to 50 rpm. 90 parts of EPDM and 30 parts of branched polyethylene were added, prepressed and mixed for 70 seconds. 5 parts of zinc oxide, 7 parts of calcium oxide and 1 part of stearic acid were then added, and mixed for 1 min. Then 90 parts of carbon black N550, 15 parts of calcium carbonate and 60 parts of paraffin oil SUNPAR2280 were added, and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 8

Branched polyethylene No. PER-5 was used.

The processing steps of the rubber composition were as follows.

(1) Mixing: The temperature of the internal mixer was set to 90° C., and the rotor speed was set to 50 rpm. 100 parts of branched polyethylene was added, prepressed and mixed for 90 seconds. 5 parts of zinc oxide, 7 parts of calcium oxide and 1 part of stearic acid were then added, and mixed for 1 min. Then 90 parts of carbon black N550, 15 parts of calcium carbonate and 60 parts of paraffin oil SUNPAR2280 were added, and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparative Example 3

The processing steps were as follows.

(1) Mixing: The temperature of the internal mixer was set to 90° C., and the rotor speed was set to 50 rpm. 100 parts of EPDM was added, prepressed and mixed for 90 seconds. 5 parts of zinc oxide, 7 parts of calcium oxide and 1 part of stearic acid were then added, and mixed for 1 min. Then 90 parts of carbon black N550, 15 parts of calcium carbonate and 60 parts of paraffin oil SUNPAR2280 were added, and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 9

Branched polyethylene No. PER-4 was used.

The processing steps of the rubber composition were as follows.

(1) Mixing: The temperature of the internal mixer was set to 90° C., and the rotor speed was set to 40 rpm. 80 parts of EPDM and 20 parts of branched polyethylene were added, prepressed and mixed for 90 seconds. 5 parts of zinc oxide, 1 part of stearic acid, and 2 parts of the anti-aging agent 2,2,4-trimethyl-1,2-dihydroquinoline polymer (RD) were then added, and mixed for 1 min. Then 50 parts of carbon black N330, 10 parts of calcium carbonate, 5 parts of paraffin oil SUNPAR2280, and 4 parts of coumarone resin were added, and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 10

Branched polyethylene No. PER-4 was used.

The processing steps of the rubber composition were as follows.

(1) Mixing: The temperature of the internal mixer was set to 90° C., and the rotor speed was set to 40 rpm. 50 parts of EPDM and 50 parts of branched polyethylene were added, prepressed and mixed for 90 seconds. 5 parts of zinc oxide, 1 part of stearic acid, and 2 parts of the anti-aging agent RD were then added, and mixed for 1 min. 50 parts of carbon black N330, 10 parts of calcium carbonate, 5 parts of paraffin oil SUNPAR2280, and 4 parts of coumarone resin were added and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 11

Branched polyethylene No. PER-4 was used.

The processing steps of the rubber composition were as follows.

(1) Mixing: The temperature of the internal mixer was set to 90° C., and the rotor speed was set to 40 rpm. 100 parts of branched polyethylene were added, prepressed and mixed for 90 seconds. 5 parts of zinc oxide, 1 part of stearic acid, and 2 parts of the anti-aging agent RD were then added, and mixed for 1 min. 50 parts of carbon black N330, 10 parts of calcium carbonate, 5 parts of paraffin oil SUNPAR2280, and 4 parts of coumarone resin were added and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 12

Branched polyethylene Nos. PER-1 and PER-7 were used.

The processing steps of the rubber composition were as follows.

(1) Mixing: The temperature of the internal mixer was set to 90° C., and the rotor speed was set to 40 rpm. 30 parts of PER-1 and 70 parts of PER-7 were added, prepressed and mixed for 90 seconds. 5 parts of zinc oxide, 1 part of stearic acid, and 2 parts of the anti-aging agent RD were then added, and mixed for 1 min. 50 parts of carbon black N330, 10 parts of calcium carbonate, 5 parts of paraffin oil SUNPAR2280, and 4 parts of coumarone resin were added and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparative Example 4

The processing steps were as follows.

(1) Mixing: The temperature of the internal mixer was set to 90° C., and the rotor speed was set to 40 rpm. 100 parts of EPDM was added, prepressed and mixed for 90 seconds. 5 parts of zinc oxide, 1 part of stearic acid, and 2 parts of the anti-aging agent RD were then added, and mixed for 1 min. 50 parts of carbon black N330, 10 parts of calcium carbonate, 5 parts of paraffin oil SUNPAR2280, and 4 parts of coumarone resin were added and mixed for 3 min. Finally, 3 parts of the crosslinking agent dicumyl peroxide (DCP), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The performance test data of Examples 6 to 12 and Comparative Examples 3 and 4 are shown in a table below.

| Test Item | Example 6 | Example 7 | Example 8 | Comparative Example 3 | Example 9 | Example 10 | Example 11 | Example 12 | Comparative Example 4 |
|---|---|---|---|---|---|---|---|---|---|
| Hardness | 64 | 63 | 61 | 63 | 58 | 59 | 59 | 60 | 58 |
| Tensile strength/MPa | 16.2 | 16.9 | 18.8 | 14.8 | 17.4 | 18.2 | 19.6 | 19.3 | 16.3 |
| Elongation at break % | 469 | 522 | 528 | 532 | 548 | 519 | 533 | 527 | 566 |
| Compression set (at 70° C. for 22 h) | 12 | 11 | 9 | 12 | 18 | 16 | 13 | 15 | 19 |

| Test Item | Example 6 | Example 7 | Example 8 | Comparative Example 3 | Example 9 | Example 10 | Example 11 | Example 12 | Comparative Example 4 |
|---|---|---|---|---|---|---|---|---|---|
| After aging (at 150° C. for 72 h) | | | | | | | | | |
| Hardness | 65 | 63 | 63 | 64 | 61 | 61 | 61 | 62 | 60 |
| Retention rate of tensile strength/% | 96 | 96 | 97 | 97 | 107 | 105 | 103 | 104 | 106 |
| Retention rate of elongation at break/% | 90 | 91 | 92 | 91 | 93 | 92 | 94 | 93 | 92 |

Example 13

Branched polyethylene No. PER-8 was used.

The processing steps of the rubber composition were as follows.

(1) Mixing: The temperature of the internal mixer was set to 90° C., and the rotor speed was set to 40 rpm. 50 parts of EPDM and 50 parts of branched polyethylene were added, prepressed and mixed for 90 seconds. 5 parts of zinc oxide and 1 part of stearic acid were then added, and mixed for 1 min. Then 75 parts of carbon black N330, and 20 parts of hydrogenated rosin were added, and mixed for 3 min. Finally, 3.5 parts of the crosslinking agent dicumyl peroxide (DCP), 3 parts of N,N'-m-phenylene bismaleimide and 1 part of the auxiliary crosslinking agent paraquinonedioxime were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The rubber composition can be used to produce a rubber railway pad.

Example 14

Branched polyethylene Nos. PER-2 and PER-8 were used.

The processing steps of the rubber composition were as follows.

(1) Mixing: The temperature of the internal mixer was set to 90° C., and the rotor speed was set to 40 rpm. 80 parts of PER-8 and 20 parts of PER-2 were added, prepressed and mixed for 90 seconds. 5 parts of zinc oxide and 1 part of stearic acid were then added, and mixed for 1 min. Then 75 parts of carbon black N330, and 20 parts of hydrogenated rosin were added, and mixed for 3 min. Finally, 3.5 parts of the crosslinking agent dicumyl peroxide (DCP), 3 parts of 3 parts of N,N'-m-phenylene bismaleimide and 1 part of the auxiliary crosslinking agent paraquinonedioxime were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparative Example 5

The processing steps were as follows.

(1) Mixing: The temperature of the internal mixer was set to 90° C., and the rotor speed was set to 40 rpm. 100 parts of EPDM was added, prepressed and mixed for 90 seconds. 5 parts of zinc oxide and 1 part of stearic acid were then added, and mixed for 1 min. Then 75 parts of carbon black N330, and 20 parts of hydrogenated rosin were added, and mixed for 3 min. Finally, 3.5 parts of the crosslinking agent dicumyl peroxide (DCP), 3 parts of 3 parts of N,N'-m-phenylene bismaleimide and 1 part of the auxiliary crosslinking agent paraquinonedioxime were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 15

Branched polyethylene No. PER-7 was used.

The processing steps of the rubber composition were as follows.

(1) Mixing: The temperature of the internal mixer was set to 90° C., and the rotor speed was set to 40 rpm. 100 parts of branched polyethylene were added, prepressed and mixed for 90 seconds. 5 parts of zinc oxide, and 1 part of stearic acid were then added, and mixed for 1 min. Then 125 parts of carbon black N330, 80 parts of paraffin oil SUNPAR2280, and 5 parts of polyethylene wax were added, and mixed for 3 min. Finally, 4 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 16

Branched polyethylene No. PER-4 was used.

The processing steps of the rubber composition were as follows.

(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 45 parts of carbon black N330, 5 parts of paraffin oil SUNPAR2280, and 3 parts of coumarone resin were added, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 17

Branched polyethylene No. PER-6 was used.
The processing steps of the rubber composition were as follows.

(1) Mixing: The temperature of the internal mixer was set to 90° C., and the rotor speed was set to 40 rpm. 100 parts of branched polyethylene was added, prepressed and mixed for 90 seconds. 10 parts of zinc oxide, 1 part of the anti-aging agent RD and 1 part of stearic acid were added and mixed for 1 min. Then 80 parts of carbon black N550, and 100 parts of paraffin oil SUNPAR2280 were added, and mixed for 3 min. Finally, 3 parts of the crosslinking agent dicumyl peroxide (DCP), 0.5 part of N-cyclohexyl-2-benzothiazole sulfenamide (CZ), 1.25 parts of tetramethyl thiuram disulfide (TT) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 18

Branched polyethylene No. PER-6 was used.
The processing steps of the rubber composition were as follows.

(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 65 parts of carbon black N330, and 45 parts of paraffin oil SUNPAR2280 were added, and mixed for 3 min. Finally, 3 parts of the crosslinking agent dicumyl peroxide (DCP), and 2 parts of the auxiliary crosslinking agent ethylene glycol dimethacrylate were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 19

Branched polyethylene No. PER-3 was used.
The processing steps of the rubber composition were as follows.

(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were then added, and mixed for 1 min. Then 60 parts of carbon black N550, 80 parts of calcium carbonate and 120 parts of paraffin oil SUNPAR2280 were added, and mixed for 3 min. Finally, 1 part of the crosslinking agent dicumyl peroxide (DCP), 0.3 part of the auxiliary crosslinking agent triallyl isocyanurate (TAIC), 0.5 part of the crosslinking agent sulfur, 1 part of N-cyclohexyl-2-benzothiazole sulfenamide (CZ), and 0.8 part of tetramethyl thiuram disulfide (TMTD) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 20

Branched polyethylene No. PER-5 was used.
The processing steps of the rubber composition were as follows.

(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 50 parts of carbon black N330, 60 parts of carbon black N550, and 240 parts of paraffin oil SUNPAR2280 were added, and mixed for 3 min. Finally, 8 parts of the crosslinking agent dicumyl peroxide (DCP), 2 parts of the auxiliary crosslinking agent triallyl isocyanurate (TAIC) and 8 parts of the auxiliary crosslinking agent 1,2-polybutadiene were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The performance test data of Examples 13 to 20 and Comparative Examples 1 and 5 are shown in a table below.

| Test Item | Example 13 | Example 14 | Comparative Example 5 | Example 15 | Example 16 | Example 17 | Example 18 | Example 19 | Example 20 |
|---|---|---|---|---|---|---|---|---|---|
| Hardness | 76 | 75 | 78 | 72 | 60 | 52 | 59 | 41 | 42 |
| Tensile strength/MPa | 22.8 | 23.7 | 20.9 | 21.9 | 19.6 | 21.3 | 17.6 | 8.9 | 7.3 |
| Elongation at break % | 337 | 329 | 322 | 359 | 521 | 549 | 496 | 687 | 672 |
| Compression set (at 70° C. for 22 h) | 14 | 14 | 15 | 12 | 15 | 10 | 9 | 22 | 25 |
| After aging (at 150° C. for 72 h) | | | | | | | | | |
| Hardness | 78 | 78 | 82 | 73 | 62 | 54 | 61 | 44 | 46 |
| Retention rate of tensile strength/% | 103 | 104 | 105 | 96 | 105 | 96 | 97 | 78 | 82 |

-continued

| Test Item | Example 13 | Example 14 | Comparative Example 5 | Example 15 | Example 16 | Example 17 | Example 18 | Example 19 | Example 20 |
|---|---|---|---|---|---|---|---|---|---|
| Retention rate of elongation at break/% | 96 | 95 | 94 | 94 | 94 | 93 | 95 | 68 | 94 |

Example 21

Branched polyethylene No. PER-4 was used.
The processing steps of the rubber composition were as follows.
(1) Mixing: The temperature of the internal mixer was set to 90° C., and the rotor speed was set to 40 rpm. 100 parts of branched polyethylene and 1 part of stearic acid were added, prepressed and mixed for 90 seconds. Then 30 parts of carbon black N550, and 5 parts of paraffin oil SUNPAR2280 were added, and mixed for 3 min. Finally, 4 parts of the crosslinking agent dicumyl peroxide (DCP) was added, mixed for 2 min, and then discharged. The rubber mix was plasticated on an open mill with a roll temperature of 60° C. to obtain a sheet having a thickness of about 2.5 mm, which was stood for 20 hours.
(2) After vulcanization, various tests were carried out after standing for 16 hrs.

Example 22

Branched polyethylene No. PER-4 was used.
The processing steps of the rubber composition were as follows.
(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 120 parts of carbon black N550, 80 parts of calcium carbonate, and 180 parts of paraffin oil SUNPAR2280 were added, and mixed for 3 min. Finally, 10 parts of the crosslinking agent dicumyl peroxide (DCP), 3 parts of the auxiliary crosslinking agent triallyl isocyanurate (TAIC) and 7 parts of the auxiliary crosslinking agent 1,2-polybutadiene were added, mixed for 2 min, and then discharged. The rubber mix was plasticated on an open mill with a roll temperature of 60° C. to obtain a sheet having a thickness of about 2.5 mm, which was stood for 20 hours.
(2) After vulcanization, various tests were carried out after standing for 16 hrs.

Example 23

Branched polyethylene No. PER-7 was used.
The processing steps of the rubber composition were as follows.
(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 30 parts of carbon black N330, 50 parts of carbon black N550 and 5 parts of paraffin oil SUNPAR2280 were added, and mixed for 3 min. Finally, 3.5 parts of the crosslinking agent dicumyl peroxide (DCP) was added, mixed for 2 min, and then discharged. The rubber mix was plasticated on an open mill with a roll temperature of 60° C. to obtain a sheet having a thickness of about 2.5 mm, which was stood for 20 hours.
(2) After vulcanization, various tests were carried out after standing for 16 hrs.

Example 24

Branched polyethylene No. PER-6 was used.
The processing steps were as follows.
(1) Mixing: The temperature of the internal mixer was set to 90° C., and the rotor speed was set to 40 rpm. 100 parts of branched polyethylene was added, prepressed and mixed for 90 seconds. 6 parts of zinc oxide, 2 parts of the anti-aging agent RD and 1 part of stearic acid were added and mixed for 1 min. Then 55 parts of carbon black N330, 5 parts of paraffin oil SUNPAR2280, and 5 parts of coumarone resin were added, and mixed for 3 min. Finally, 4 parts of the crosslinking agent dicumyl peroxide (DCP), 1.5 parts of the auxiliary crosslinking agent triallyl isocyanurate (TAIC), 8 parts of the auxiliary crosslinking agent zinc methacrylate and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.
(2) After vulcanization, various tests were carried out after standing for 16 hrs.

Example 25

Branched polyethylene No. PER-5 was used.
The processing steps were as follows.
(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 100 parts of carbon black N550, and 75 parts of paraffin oil SUNPAR2280 were added, and mixed for 3 min. Finally, 2 parts of the crosslinking agent dicumyl peroxide (DCP), 1 part of the auxiliary crosslinking agent triallyl isocyanurate (TAIC) and 0.2 parts of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.
(2) After vulcanization, various tests were carried out after standing for 16 hrs.

Example 26

Branched polyethylene No. PER-4 was used.
The processing steps were as follows.
(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 50 parts of carbon black N550, and 5 parts of polyethylene wax were added, and mixed for 3 min. Finally, 3.5 parts of the crosslinking agent dicumyl peroxide (DCP), and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The performance test data of Examples 21 to 26 are shown in a table below.

| Test Item | Example 21 | Example 22 | Example 23 | Example 24 | Example 25 | Example 26 |
|---|---|---|---|---|---|---|
| Hardness | 55 | 61 | 80 | 73 | 62 | 70 |
| Tensile strength/MPa | 13.7 | 12.2 | 21.8 | 16.7 | 13.9 | 17.4 |
| Elongation at break % | 547 | 481 | 276 | 332 | 413 | 489 |
| Compression set (at 70° C. for 22 h) | 16 | 17 | 24 | 14 | 12 | 10 |
| After aging (at 150° C. for 72 h) | | | | | | |
| Hardness | 57 | 64 | 82 | 74 | 65 | 72 |
| Retention rate of tensile strength/% | 92 | 88 | 89 | 113 | 108 | 106 |
| Retention rate of elongation at break/% | 85 | 83 | 82 | 94 | 95 | 92 |

Example 27

Branched polyethylene No. PER-5 was used.
The processing steps were as follows.
(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 70 parts of carbon black N330, 30 parts of carbon black N550, 40 parts of paraffin oil SUNPAR2280, and 5 parts of coumarone resin were added, and mixed for 3 min. Finally, 4 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Example 28

Branched polyethylene No. PER-5 was used.
The processing steps were as follows.
(1) Mixing: The temperature of the internal mixer was set to 90° C., and the rotor speed was set to 40 rpm. 100 parts of branched polyethylene was added, prepressed and mixed for 90 seconds. Then 120 parts of carbon black N330, 30 parts of talc, and 105 parts of paraffin oil SUNPAR2280 were added, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

Comparative Example 6

The processing steps were as follows.
(1) Mixing: The temperature of the internal mixer was set to 90° C., and the rotor speed was set to 40 rpm. 100 parts of EPDM was added, prepressed and mixed for 90 seconds. 5 parts of zinc oxide and 1 part of stearic acid were added and mixed for 1 min. Then 70 parts of carbon black N330, 30 parts of carbon black N550, 40 parts of paraffin oil SUNPAR2280, and 5 parts of coumarone resin were added, and mixed for 3 min. Finally, 4 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The performance test data of Examples 27 and 28 and Comparative Example 6 are shown in a table below.

| Test Item | Example 27 | Example 28 | Comparative Example 6 |
|---|---|---|---|
| Hardness | 63 | 62 | 62 |
| Tensile strength/MPa | 13.6 | 14.9 | 11.6 |
| Elongation at break % | 528 | 411 | 560 |
| Tear strength N/mm | 34.1 | 37.8 | 28 |
| After aging (at 150° C. for 72 h) | | | |
| Hardness | 65 | 64 | 64 |
| Retention rate of tensile strength/% | 103 | 108 | 112 |
| Retention rate of elongation at break/% | 89 | 92 | 87 |

Example 29

Branched polyethylene No. PER-4 was used.
The processing steps were as follows.
(1) Mixing: The temperature of the internal mixer was set to 90° C., and the rotor speed was set to 40 rpm. 100 parts of branched polyethylene was added, prepressed and mixed for 90 seconds. 5 parts of zinc oxide and 1 part of stearic acid were added and mixed for 1 min. Then 40 parts of carbon black N330, 60 parts of barium sulfate, 10 parts of paraffin oil SUNPAR2280, and 8 parts of polyethylene wax were added, and mixed for 3 min. Finally, 7 parts of the crosslinking agent dicumyl peroxide (DCP) was added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The present invention also provides various use of the rubber composition in the production of rubber expansion and contraction installations for bridge, rubber railway pads, plate-type rubber supports of bridge, basin-type rubber supports of bridge, rubber/steel plate composite expansion and contraction installations, rubber fenders, rubber water stops, vehicle shock-absorbing supports, rubber rollers, high-temperature resistant ribbed belts, windshield wipers, sealing rings, waterproof coils, and others. Specific examples are provided below.

Example 30

A plate-type rubber support of bridge was produced through the following steps.

The plate-type rubber support of bridge comprises a steel plate and a rubber sheet, where the rubber sheet and the steel plate are bonded together as a whole by coating an adhesive, pressing and vulcanizing, and the components in the rubber composition used in the rubber sheet in this example are weighed and mixed according to the formulation and mixing ratio shown in Example 2.

(1) Rubber mixing process: The temperature of the internal mixer was set to 90° C., and the rotor speed was set to 50 rpm. 100 parts of branched polyethylene was added, prepressed and mixed for 90 seconds. 5 parts of zinc oxide and 1 part of stearic acid were added and mixed for 1 min. Then 50 parts of carbon black N330, and 5 parts of paraffin oil SUNPAR2280 were added, and mixed for 3 min. Finally, 3 parts of the crosslinking agent dicumyl peroxide (DCP), 5 parts of the auxiliary crosslinking agent zinc methacrylate and 0.2 part of the auxiliary crosslinking agent sulfur were added, mixed for 2 min, and then discharged. The rubber mix was plasticated on an open mill, and the sheet was unloaded, stood and inspected. The sheet was numbered, remilled, calendered, discharged and punched into a semi-finished rubber sheet of desired specification for use in the vulcanization procedure.

(2) Vulcanization process: The rubber sheet, and a steel plate that was surface treated and coated with an adhesive were sequentially laminated according to the process requirements, then filled into a preheated mold, and vulcanized for 25 min on a press vulcanizer at a vulcanization temperature of 160° C., under a steam pressure of 0.6 MPa.

(3) Post-treatment: After vulcanization, the mold was pulled out and disassembled, and the finished rubber support product was removed, cooled, stood and trimmed to obtain the finished product.

Example 31

A plate-type rubber support of bridge was produced through the following steps.

The plate-type rubber support of bridge comprises a steel plate, a polytetrafluoroethylene plate and a rubber sheet, where the rubber sheet, the polytetrafluoroethylene plate and the steel plate are bonded together as a whole by coating an adhesive, pressing and vulcanizing. The components in the rubber composition used in the rubber sheet in this example are weighed and mixed according to the formulation and mixing ratio shown in Example 2.

(1) Rubber mixing process: The temperature of the internal mixer was set to 90° C., and the rotor speed was set to 50 rpm. 100 parts of branched polyethylene PER-6 was added, prepressed and mixed for 90 seconds. 5 parts of zinc oxide and 1 part of stearic acid were added and mixed for 1 min. Then 50 parts of carbon black N330, and 5 parts of paraffin oil SUNPAR2280 were added, and mixed for 3 min. Finally, 3 parts of the crosslinking agent dicumyl peroxide (DCP), 5 parts of the auxiliary crosslinking agent zinc methacrylate and 0.2 part of the auxiliary crosslinking agent sulfur were added, mixed for 2 min, and then discharged. The rubber mix was plasticated on an open mill, and the sheet was unloaded, stood and inspected. The sheet was numbered, remilled, calendered, discharged and punched into a semi-finished rubber sheet of desired specification for use in the vulcanization procedure.

(2) Vulcanization process: The rubber sheet, and the steel plate and the polytetrafluoroethylene plate that were surface treated and coated with an adhesive were sequentially laminated according to the process requirements, then filled into a preheated mold, and vulcanized for 25 min on a press vulcanizer at a vulcanization temperature of 160° C., under a steam pressure of 0.6 MPa.

(3) Post-treatment: After vulcanization, the mold was pulled out and disassembled, and the finished rubber support product was removed, cooled, stood and trimmed to obtain a plate-type rubber support for simply-supported long-span bridge.

Example 32

The basin-type rubber support in this example comprises an upper support plate, a stainless steel plate, a polytetrafluoroethylene plate, an intermediate steel plate, a sealing ring, a rubber bearing plate, a lower support plate, and an anchor of the support. The rubber bearing plate in this example had the same rubber composition as that in Example 5, and was produced through the following steps:

(1) Rubber mixing process: The temperature of the internal mixer was set to 90° C., and the rotor speed was set to 50 rpm. 30 parts of EPDM and 70 parts of branched polyethylene PER-5 were added, prepressed and mixed for 90 seconds. 5 parts of zinc oxide and 1 part of stearic acid were added and mixed for 1 min. Then 65 parts of carbon black N330 and 5 parts of paraffin oil SUNPAR2280 were added, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill, and the sheet was unloaded, stood, and inspected.

(2) Vulcanization process: Molding vulcanization was adopted, where the vulcanization temperature was 160° C., the steam pressure was 0.6 MPa, and the vulcanization time was 25 minutes.

(3) The sheet was cooled, stood, and trimmed to obtain a rubber bearing plate.

The rubber bearing plate was assembled with other components, to obtain a basin-type rubber support.

Example 33

A rubber expansion and contraction body of a rubber expansion and contraction installation for bridge was produced through an extrusion method comprising specifically the following steps.

(1) Mixing: The rubber expansion and contraction body in this example was produced with the rubber composition of Example 8. The temperature of the internal mixer was set to 90° C., and the rotor speed was set to 50 rpm. 100 parts of branched polyethylene PER-5 was added, prepressed and mixed for 90 seconds. 5 parts of zinc oxide, 7 parts of calcium oxide and 1 part of stearic acid were added and mixed for 1 min. Then 90 parts of carbon black N550, 15 parts of calcium carbonate, and 60 parts of paraffin oil SUNPAR2280 were added, and mixed for 3 min. Finally, 3 parts of the crosslinking agent dicumyl peroxide (DCP), and 0.3 parts of the auxiliary crosslinking agent sulfur were added, mixed for 2 min, and then discharged. The rubber mix was plasticated on an open mill, and the sheet was unloaded, stood and inspected.

(2) Extrusion and vulcanization: The extrusion and vulcanization process was carried out using an evacuation extruder. The temperature of the extruder was set such that the head temperature was 90-100° C., and the screw temperature was 70-80° C., the head pressure was controlled to 15-20 MPa, and the rotation speed of the extruder was 25-30 rpm. A salt bath vulcanization process was employed, where the temperature in the spray section was 250° C., the temperature in the deeping section was 220° C., the temperature in the deeping pressing section was 220° C., the transmission speed was 35-45 m/min, and the temperature in the cooling section was 25-30° C.

(3) After cooling, trimming, and inspecting, a finished product was obtained.

Example 34

A rubber expansion and contraction body of a rubber expansion and contraction installation for bridge was produced through a molding method comprising specifically the following steps.

(1) Mixing: The rubber expansion and contraction body in this example was produced with the rubber composition of Example 11. The temperature of the internal mixer was set to 90° C., and the rotor speed was set to 40 rpm. 100 parts of branched polyethylene PER-4 was added, prepressed and mixed for 90 seconds. 5 parts of zinc oxide, 2 parts of calcium oxide and 1 part of stearic acid were added and mixed for 1 min. Then 50 parts of carbon black N330, 10 parts of calcium carbonate, 5 parts of paraffin oil SUNPAR2280, and 4 parts of coumarone resin were added, and mixed for 3 min. Finally, 3 parts of the crosslinking agent dicumyl peroxide (DCP), and 0.3 parts of the auxiliary crosslinking agent sulfur were added, mixed for 2 min, and then discharged. The rubber mix was plasticated on an open mill, and the sheet was unloaded, stood and inspected.

The discharged sheet was remilled, weighed, and molded.

(2) Molding vulcanization: The vulcanization temperature was 160° C., the steam pressure was 0.6 MPa, and the vulcanization time was 25 minutes.

(3) After cooling, trimming, and inspecting, a finished product was obtained.

Example 35

A rubber/steel plate composite expansion and contraction installation was produced through the following steps.

(1) Mixing and molding: The rubber portion was produced with the rubber composition of Example 11. The temperature of the internal mixer was set to 90° C., and the rotor speed was set to 40 rpm. 100 parts of branched polyethylene PER-4 was added, prepressed and mixed for 90 seconds. 5 parts of zinc oxide, 1 part of stearic acid, and 2 parts of the anti-aging agent RD were added and mixed for 1 min. Then 50 parts of carbon black N330, 10 parts of calcium carbonate, 5 parts of paraffin oil SUNPAR2280, and 4 parts of coumarone resin were added, and mixed for 3 min. Finally, 3 parts of the crosslinking agent dicumyl peroxide (DCP), and 0.3 parts of the auxiliary crosslinking agent sulfur were added, mixed for 2 min, and then discharged. The rubber mix was plasticated on an open mill, and the sheet was unloaded, stood and inspected. The discharged sheet was remilled, weighed, and molded.

(2) Vulcanization process: The rubber sheet, and a steel plate that was surface treated and coated with an adhesive were laminated according to the process requirements, then filled into a preheated mold, and vulcanized for 25 min on a press vulcanizer at a vulcanization temperature of 160° C., under a steam pressure of 0.6 MPa.

(3) Post-treatment: After vulcanization, the mold was pulled out and disassembled, and the finished rubber support product was removed, cooled, stood and trimmed to obtain the finished product.

Example 36

A rubber railway pad was produced through the following steps.

(1) Mixing: The rubber composition in Example 14 was used. The temperature of the internal mixer was set to 90° C., and the rotor speed was set to 40 rpm. 80 parts of PER-8 and 20 parts of PER-1 were added, prepressed and mixed for 90 seconds. 5 parts of zinc oxide and 1 part of stearic acid were then added, and mixed for 1 min. Then 75 parts of carbon black N330, and 20 parts of hydrogenated rosin were added, and mixed for 3 min. Finally, 3.5 parts of the crosslinking agent dicumyl peroxide (DCP), 3 parts of N,N'-m-phenylene bismaleimide and 1 part of the auxiliary crosslinking agent paraquinonedioxime were added, mixed for 2 min, and then discharged. The rubber mix was stood, inspected, and hot milled, the sheet was discharged according to the desired thickness, and cut to have the desired specification and shape, for use in the vulcanization process.

(2) Molding vulcanization: The vulcanization temperature was 160° C., the steam pressure was 0.6 MPa, and the vulcanization time was 25 minutes.

(3) The rubber sheet was trimmed, and inspected to obtain a finished product.

Example 37

A rubber fender was produced through the following steps.

(1) Mixing: The rubber composition in Example 15 was used. The temperature of the internal mixer was set to 90° C., and the rotor speed was set to 40 rpm. 100 parts of branched polyethylene PER-7 was added, prepressed and mixed for 90 seconds. 5 parts of zinc oxide and 1 part of stearic acid were added and mixed for 1 min. Then 125 parts of carbon black N330, 80 parts of paraffin oil SUNPAR2280 SUNPAR2280 and 5 parts of polyethylene wax were added, and mixed for 3 min. Finally, 4 parts of the crosslinking agent dicumyl peroxide (DCP), and 1 part of the auxiliary crosslinking agent triallyl isocyanurate (TAIC) were added, mixed for 2 min, and then discharged.

(2) Molding vulcanization: The rubber mix was fed to a mold cavity, the mold was closed, and the rubber compound was flowed fully, followed by venting, mold closing, and vulcanizing, where the vulcanization temperature was 160° C., and the vulcanization time was 25 minutes.

(3) The mold was opened, and the product was removed, trimmed, and inspected to obtain a finished product.

Example 38

A rubber water stop was produced through the following steps.

(1) Mixing and molding: The rubber composition in Example 16 was used. The temperature of the internal mixer was set to 90° C., and the rotor speed was set to 40 rpm. 100 parts of branched polyethylene PER-4 was added, prepressed and mixed for 90 seconds. 5 parts of zinc oxide and 1 part of stearic acid were added and mixed for 1 min. Then 45 parts of carbon black N330, 5 parts of paraffin oil SUNPAR2280, and 3 parts of coumarone resin were added, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The discharged sheet was stood, inspected, remilled, weighed, and molded.

(2) Molding vulcanization: The vulcanization temperature was 160° C., the steam pressure was 0.6 MPa, and the vulcanization time was 25 minutes.

(3) The rubber sheet was trimmed, and inspected to obtain a finished product.

Example 39

A steel-edge rubber water stop was produced through the following steps.

(1) Mixing and molding of rubber portion: The rubber composition in Example 16 was used. The temperature of the internal mixer was set to 90° C., and the rotor speed was set to 40 rpm. 100 parts of branched polyethylene PER-4 was added, prepressed and mixed for 90 seconds. 5 parts of zinc oxide and 1 part of stearic acid were added and mixed for 1 min. Then 45 parts of carbon black N330, 5 parts of paraffin oil SUNPAR2280, and 3 parts of coumarone resin were added, and mixed for 3 min. Finally, 3 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The discharged sheet was stood, inspected, remilled, weighed, and molded.

(2) Vulcanization process: The rubber sheet, and a steel plate that was surface treated and coated with an adhesive were laminated according to the process requirements, then filled into a preheated mold, and vulcanized for 25 min on a press vulcanizer at a vulcanization temperature of 160° C., under a steam pressure of 0.6 MPa.

(3) The rubber sheet was trimmed, and inspected to obtain a finished product.

Example 40

A vehicle shock-absorbing support was produced through the following steps.

(1) Mixing and molding of rubber portion: The rubber composition in Example 17 was used. The temperature of the internal mixer was set to 90° C., and the rotor speed was set to 40 rpm. 100 parts of branched polyethylene was added, prepressed and mixed for 90 seconds. 10 parts of zinc oxide, 1 part of the anti-aging agent RD and 1 part of stearic acid were added and mixed for 1 min. Then 80 parts of carbon black N550, and 100 parts of paraffin oil SUNPAR2280 were added, and mixed for 3 min. Finally, 3 parts of the crosslinking agent dicumyl peroxide (DCP), 0.5 part of N-cyclohexyl-2-benzothiazole sulfenamide (CZ), 1.25 parts of tetramethyl thiuram disulfide (TT) and 0.3 part of the auxiliary crosslinking agent sulfur were added, mixed for 2 min, and then discharged. The discharged sheet was stood, inspected, remilled, weighed, and molded.

(2) Vulcanization process: The rubber sheet, and a metal piece that was surface treated and coated with an adhesive were laminated according to the process requirements, then filled into a preheated mold, and vulcanized for 25 min on a press vulcanizer at a vulcanization temperature of 160° C., under a steam pressure of 0.6 MPa.

(3) The rubber sheet was trimmed, and inspected to obtain a finished product.

The shock-absorbing support produced in this example can be used in high-temperature sites such as engine and exhaust pipe.

Example 41

A rubber roller was produced through the following steps.

(1) Mixing: The rubber composition in Example 18 was used. The temperature of the internal mixer was set to 90° C., and the rotor speed was set to 40 rpm. 100 parts of branched polyethylene PER-6 was added, prepressed and mixed for 90 seconds. 5 parts of zinc oxide and 1 part of stearic acid were added and mixed for 1 min. Then 65 parts of carbon black N330, and 45 parts of paraffin oil SUNPAR2280 were added, and mixed for 3 min. Finally, 3 parts of the crosslinking agent dicumyl peroxide (DCP), and 2 parts of the auxiliary crosslinking agent ethylene glycol dimethacrylate were added, mixed for 2 min, and then discharged. The rubber compound was plasticated on an open mill, and then the sheet was discharged and stood for 24 hrs.

(2) Winding and wrapping: The rubber mix was fed to a screw extruder; a rubber sheet with a thickness and width required by the process was extruded; after the rubber sheet was uniform, the rotating wrapping machine was started to wind the rubber sheet onto a ready-to-use metal roller core; the rubber was wound and wrapped layer by layer until the thickness at the wrapped single side reached the specified thickness; and then 2-3 layers of nylon cure wrapping tape was wound on the rubber surface to obtain a wrapped rubber roller.

(3) Vulcanization by a vulcanization tank: The wrapped rubber roller was sent to a vulcanization tank, and then the tank was closed. Steam was introduced into the vulcanization tank for vulcanization, during which the compressed air valve was opened to introduce compressed air, such that the pressure in the vulcanization tank reached 4.5-5 atmospheres in 0.5 h. The vulcanization procedure was heating to 70-80° C. and heat preserving for 2 h; then heating to 100-110° C. and heat preserving for 0.5 h; next heating to 120-130° C. and heat preserving for 0.5 h; and then heating to 135-140° C. and heat preserving for 8-10 h. After vulcanization, the vent valve was opened to reduce the pressure. The safety pin was opened when the pressure gauge pointed to zero. Then the vulcanization tank was half opened when the steam was emitted and escaped from the pin hole, to allow the temperature to decrease. The rubber roller was pulled out when the temperature inside the tank was lower than 60° C. or equivalent to the room temperature.

(4) The vulcanized rubber roller was roughly machined on a lathe, then finished on a grinding machine, and inspected to obtain a finished product.

Example 42

A high-temperature resistant ribbed belt having a buffer layer using the rubber composition provided in the present invention was produced through the following steps.

1. Mixing (1) Mixing of rubber compound used in compression layer: The temperature of the internal mixer was set to 90° C., and the rotor speed was set to 50 rpm. 100 parts of branched polyethylene PER-5 was added, prepressed and mixed for 90 seconds. 6 parts of zinc oxide, 1 part of stearic acid, and 2 parts of the anti-aging agent RD were added and mixed for 1 min. Then 45 parts of carbon black N330, 5 parts of paraffin oil SUNPAR2280 and 5 parts of coumarone resin were added to the rubber compound, and mixed for 3 min. Next, 60 parts of 1 mm-long nylon staple fiber was added and mixed for 2 min. Finally, 4 parts of the crosslinking agent dicumyl peroxide (DCP), and 1.5 part of the auxiliary crosslinking agent triallyl isocyanurate (TAIC) were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded, and stood for 20 hours.

(2) Mixing of rubber compound used in the buffer layer: The temperature of the internal mixer was set to 90° C., and the rotor speed was set to 40 rpm. 100 parts of branched polyethylene PER-5 was added, prepressed and mixed for 90 seconds. 6 parts of zinc oxide, 2 parts of the anti-aging agent RD and 1 part of stearic acid were added and mixed for 1 min. Then 55 parts of carbon black N330, 5 parts of paraffin oil SUNPAR2280, and 5 parts of coumarone resin were added, and mixed for 3 min. Finally, 4 parts of the crosslinking agent dicumyl peroxide (DCP), 1.5 parts of the auxiliary crosslinking agent triallyl isocyanurate (TAIC), 10 parts of the auxiliary crosslinking agent zinc methacrylate and 0.3 part of the auxiliary crosslinking agent sulfur were added, mixed for 2 min, and then discharged.

(2) Molding: A reverse molding method was used. A blank mold was mounted on a forming machine, the mold was cleaned, a small amount of release agent was applied, a top cloth of the ribbed belt was attached to the blank mold after volatilization, then the buffer rubber was attached, the tension of the string was corrected, the strength layer was flatly wound, then the buffer rubber was attached again, and finally the ribbed rubber was attached to the outer circumference required by the molding process to obtain a belt blank;

3. vulcanization: The belt blank was sent to a vulcanization procedure for vulcanization, where the vulcanization temperature was 160° C., the internal pressure was 0.45-0.55 MPa, the external pressure was 1.0-1.2 MPa, and the vulcanization time was 30 minutes.

(4) Post-treatment: After the vulcanization is completed, the belt roll was cooled, released from the mold, sent to a cutting procedure, and cut according to the required width. The back side was rubbed, and the ribs were rubbed, to obtain a finished product after trimming, and inspecting.

Example 43

A windshield wiper was produced through the following steps.

(1) Mixing: The rubber composition in Example 25 was used. The temperature of the internal mixer was set to 90° C., and the rotor speed was set to 40 rpm. 100 parts of branched polyethylene PER-5 was added, prepressed and mixed for 90 seconds. 5 parts of zinc oxide and 1 part of stearic acid were added and mixed for 1 min. Then 65 parts of carbon black N330, and 45 parts of paraffin oil SUNPAR2280 were added, and mixed for 3 min. Finally, 3 parts of the crosslinking agent dicumyl peroxide (DCP), and 2 parts of the auxiliary crosslinking agent ethylene glycol dimethacrylate were added, mixed for 2 min, and then discharged. The rubber compound was plasticated on an open mill, and then the sheet was discharged and stood for 24 hrs.

(2) The rubber mix was injected into a mold cavity, and vulcanized and molded at 160° C. for 25 min.

(3) The vulcanized product was subjected to surface treatment and inspected to obtain a finished product.

Example 44

A sealing ring was produced through the following steps.

(1) Mixing: The rubber composition in Example 26 was used. The temperature of the internal mixer was set to 90° C., and the rotor speed was set to 40 rpm. 100 parts of branched polyethylene PER-4 was added, prepressed and mixed for 90 seconds. 5 parts of zinc oxide and 1 part of stearic acid were added and mixed for 1 min. Then 50 parts of carbon black N550, and 5 parts of polyethylene wax were added, and mixed for 3 min. Finally, 3.5 parts of the crosslinking agent dicumyl peroxide (DCP), and 1 part of the auxiliary crosslinking agent triallyl isocyanurate (TAIC) were added, mixed for 2 min, and then discharged. The rubber mix was plasticated on an open mill, and then the sheet was unloaded, and detected properties. The rubber mix was remilled, and extruded to obtain a semi-finished product.

(2) Vulcanization: Stage I molding vulcanization was performed for 20 min at a temperature of 160° C., and then stage II oven vulcanization was performed for 1 h at a temperature of 150° C.

(3) The rubber sheet was trimmed, and inspected to obtain a finished product.

Example 45

A waterproof coil was produced through the following steps.

(1) Mixing: The rubber composition in Example 27 was used. The temperature of the internal mixer was set to 90° C., and the rotor speed was set to 40 rpm. 100 parts of branched polyethylene PER-5 was added, prepressed and mixed for 90 seconds. 5 parts of zinc oxide and 1 part of stearic acid were added and mixed for 1 min. Then 70 parts of carbon black N330, 30 parts of carbon black N550, 40 parts of paraffin oil SUNPAR2280, and 5 parts of coumarone resin were added, and mixed for 3 min. Finally, 4 parts of the crosslinking agent dicumyl peroxide (DCP), 1 part of the auxiliary crosslinking agent triallyl isocyanurate (TAIC) and 0.3 part of the auxiliary crosslinking agent sulfur were added, mixed for 2 min, and then discharged. The block rubber compound was fed to an open mill, mixed, and then plasticated at least 4 times with the roll temperature controlled between 85 and 95° C. and the roll gap controlled to be less than 1 mm, until the surface of the rubber compound was smooth, uniform and glossy. Then, the rubber compound was further mixed and plasticated at least 4 times again. The roll gap was then adjusted to no more than 8 mm, and the rubber compound was mix three times, to obtain a sheet of well mixed rubber compound with a thickness of 8 m or less, which was cooled to 50° C. or below, discharged and stacked.

(2) Hot milling: The sheet of well mixed rubber compound was hot milled on an open mill with the roll temperature controlled between 85 to 95° C. and the roll gap controlled to be less than 6 mm until the rubber sheet was smooth and even, and then the rubber sheet was preliminarily rolled up.

(3) Calendering: The rubber sheet that was hot milled and preliminarily rolled up was placed on a calender, calendered with a roll gap adjusted according to the thickness requirement of the finished product, to obtain a semi-finished coil meeting the requirement of the thickness specification of the finished product.

(4) Rolling: An isolation liner layer was sandwiched according to the requirement of the length specification of the finished coiled sheet and the semi-finished coil was rolled up.

(5) Vulcanization: The coil was vulcanized in a nitrogen-filled vulcanizer, where the temperature in the vulcanizer was controlled to 155-165° C., the pressure was controlled to 20-25 MPa, and the vulcanization time was 25 to 30 min.

(6) Re-rolling: The vulcanized coil was unfolded, and the isolation liner layer was removed, followed by re-rolling, and packaging into a product.

Example 46

A plate-type rubber sealing strip for a radiator of an engine cooling system was produced by molding vulcanization and vulcanization in stages. The production method comprises the following steps.

(1) Rubber mixing: The temperature of the internal mixer was set to 80° C., and the rotor speed was set to 40 rpm. 100 parts of branched polyethylene PER-5 was added, prepressed and mixed for 90 seconds. 5 parts of zinc oxide, 1 part of stearic acid, 1 part of the anti-aging agent RD and 2 parts of the mixed fatty acid derivative WB42 were added and mixed for 1 min. Then 60 parts of carbon black N550 and 25 parts of paraffin oil SUNPAR2280 were added, and mixed for 3 min. Finally, 4 parts of the crosslinking agent, 1 part of the auxiliary crosslinking agent Bis-(t-Butylperoxy isopropyl) benzene (BIPB) and 0.3 part of the auxiliary crosslinking agent sulfur were added, mixed for 2 min, and then discharged. The rubber mix was stood and inspected.

(2) The rubber mix inspected qualified was subjected to extrusion molding by an extruder, cut, and vulcanized in a mold of a vulcanization apparatus, where the vulcanization pressure was 15 MPa, the vulcanization temperature was 180° C., and the vulcanization time was preferably 2.5 min.

(3) The vulcanized product was trimmed.

(4) The trimmed product was subjected to stage II vulcanization at a high temperature, where the temperature was 170° C., and the time was 30 min.

(5) The product was inspected and stored after being inspected qualified.

Example 47

An inner tire was produced through the following process.

(1) Rubber mixing: The temperature of the internal mixer was set to 100° C., and the rotor speed was set to 50 rpm. 100 parts of branched polyethylene PER-5 was added, prepressed and mixed for 90 seconds. 5 parts of zinc oxide, 1 part of stearic acid and 3 parts of coumarone resin were added and mixed for 2 min. Then 60 parts of carbon black N660, and 20 parts of paraffin oil SUNPAR2280 were added to the rubber compound, and mixed for 3 min. Finally, 4 parts of the crosslinking agent dicumyl peroxide (DCP), and 2 parts of the auxiliary crosslinking agent N,N'-m-phenylene bismaleimide (HVA-2) were added, mixed for 2 min, and then discharged. The rubber mix was strained, plasticated on an open mill, and then stood for 20 hrs.

(2) Extrusion: The extruder temperature was set to 85° C., the die temperature was set to 115° C., and the speed of the conveyor belt was matched with the extrusion speed. An inflating valve was fitted.

(3) Splicing: The belt was spliced by a splicer, and then stood.

(4) Inflation forming and vulcanization: The product was first inflated to 70%, allowed to stand for 15 seconds, and then inflated to the forming size. The vulcanization temperature was 180° C., the steam pressure was 0.9 MPa, and the vulcanization time was 8 minutes. After the vulcanization was completed, it was removed and cooled.

(5) After inspecting and trimming, a finished inner tire product was obtained.

Example 48

A plate-type rubber support of bridge was produced with a rubber composition in which the rubber matrix was 100 parts of branched polyethylene PER-12. The remaining components in the rubber composition and the processing steps were the same as those in Example 30.

The rubber mix of the rubber composition was subjected to molding vulcanization to prepare a sample, which was tested to have the following performances:

hardness: 65; tensile strength: 27.3 MPa; elongation at break: 442%; compression set (at 70° C. for 22 h): 8%.

Example 49

A vehicle shock-absorbing support was produced with a rubber composition in which the rubber matrix was 70 parts of branched polyethylene PER-10 and 30 parts of branched polyethylene PER-12. The remaining components in the rubber composition and the processing steps were the same as those in Example 40.

The rubber mix of the rubber composition was subjected to molding vulcanization to prepare a sample, which was tested to have the following performances:

hardness: 63; tensile strength: 27.5 MPa; elongation at break: 382%; compression set (at 70° C. for 22 h): 9%.

Example 50

A rubber railway pad was produced with a rubber composition in which the rubber matrix was 100 parts of branched polyethylene PER-11. The remaining components in the rubber composition and the processing steps were the same as those in Example 36.

The rubber mix of the rubber composition was subjected to molding vulcanization to prepare a sample, which was tested to have the following performances:

hardness: 75; tensile strength: 26.8 MPa; elongation at break: 347%; compression set (at 70° C. for 22 h): 9%.

In summary, it can be found through comparison that the rubber composition of the present invention has more excellent comprehensive physical properties than the rubber composition based on the ethylene-propylene rubber in the prior art, and can significantly optimize the usage of the anti-aging rubber product at low cost, and broaden the application scope of anti-aging rubber products.

What is claimed is:

1. A rubber composition, comprising a rubber matrix and essential components, wherein the rubber matrix comprises, based on 100 parts by weight of the rubber matrix, a branched polyethylene with a content represented as A, in which 0<A≤100 parts, and an ethylene-propylene rubber with a content represented as B, in which 0≤b<100 parts; and based on 100 parts by weight of the rubber matrix, the essential components comprise 1.5-10 parts of a crosslinking agent, 30-200 parts of a reinforcing filler, and 5-250 parts of a plasticizer, wherein the branched polyethylene comprises an ethylene homopolymer having a degree of branching of from 60 to 105 branches/1000 carbon atoms, a weight average molecular weight of from 268,000 to 518,000, and a Mooney viscosity ML(1+4) at 125° C. of from 42 to 102.

2. The rubber composition according to claim 1, wherein based on 100 parts by weight of the rubber matrix, the content of the branched polyethylene is A, in which 10≤A≤100 parts; said ethylene-propylene rubber is consisted of EPM and EPDM, and the content of EPM and EPDM is B, in which 0≤B≤90 parts, wherein the branched polyethylene is an ethylene homopolymer having a degree of branching of from 82 to 105 branches/1000 carbon atoms, a weight average molecular weight of from 268,000 to 401,000, and a Mooney viscosity ML(1+4) at 125° C. of from 42 to 101.

3. The rubber composition according to claim 1, comprising a rubber matrix and essential components, wherein the rubber matrix comprises, in parts by weight, 100 parts of a branched polyethylene; and based on 100 parts by weight of the rubber matrix, the essential components comprise 1.5-10 parts of a crosslinking agent, 30-200 parts of a reinforcing filler, and 8-150 parts of a plasticizer.

4. The rubber composition according to claim 1, wherein the crosslinking agent comprises at least one of a peroxide crosslinking agent and sulfur, wherein the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate; the reinforcing filler comprises at least one of carbon black, silica, calcium carbonate, talc, calcined clay, magnesium silicate, and magnesium carbonate; the plasticizer comprises at least one of pine tar, motor oil, naphthenic oil, paraffin oil, coumarone, RX-80, stearic acid, paraffin, and liquid polyisobutene.

5. The rubber composition according to claim 1, further comprising auxiliary components, which comprise, based on 100 parts by weight of the rubber matrix, 0.2 to 10 parts of an auxiliary crosslinking agent, 0.5 to 3 parts of a stabilizer, 2 to 15 parts of a metal oxide, and 0 to 3 parts of a vulcanization accelerator; the auxiliary crosslinking agent comprises at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide, N,N'-bis(furfurylidene) acetone, 1,2-polybutadiene, paraquinonedioxime, sulfur, and a metal salt of an unsaturated carboxylic acid; the metal oxide comprises at least one of zinc oxide, magnesia, calcium oxide, lead monoxide, and lead tetroxide; the stabilizer comprises at least one of 2,2,4-trimethyl-1,2-dihydroquinoline polymer, 6-ethoxy-2,2,4-trimethyl-1,2-dihydroquinoline, and 2-mercaptobenzimidazole; the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

6. A rubber support, wherein, a rubber compound used for the rubber support comprises a rubber composition comprising a rubber matrix and essential components, wherein the rubber matrix comprises, based on 100 parts by weight of the rubber matrix, a branched polyethylene with a content represented as A, in which 0<A≤100 parts, and an ethylene-propylene rubber with a content represented as B, in which 0≤B<100 parts; and based on 100 parts by weight of the rubber matrix, the essential components comprise 1.5-10 parts of a crosslinking agent, 30-200 parts of a reinforcing filler, and 5-250 parts of a plasticizer, wherein the branched polyethylene comprises an ethylene homopolymer having a degree of branching of not less than 50 branches/1000 carbon atoms, a weight average molecular weight of not less than 50,000, and a Mooney viscosity ML(1+4) at 125° C. of not less than 2; and wherein either:
the rubber support is a plate-type rubber support of bridge and comprises a steel plate and a rubber sheet, wherein the rubber sheet comprises the rubber compound;
the rubber support is a basin-type rubber support and comprises a rubber bearing plate comprising the rubber compound; or
the rubber support is a vehicle shock-absorbing support.

7. An aging resistant rubber product, wherein, a rubber compound used for the aging resistant rubber product comprises a rubber composition comprising a rubber matrix and essential components, wherein the rubber matrix comprises, based on 100 parts by weight of the rubber matrix, a branched polyethylene with a content represented as A, in which 0<A≤100 parts, and an ethylene-propylene rubber with a content represented as B, in which 0≤B<100 parts; and based on 100 parts by weight of the rubber matrix, the essential components comprise 1.5-10 parts of a crosslinking agent, 30-200 parts of a reinforcing filler, and 5-250 parts of a plasticizer, wherein the branched polyethylene comprises an ethylene homopolymer having a degree of branching of not less than 50 branches/1000 carbon atoms, a weight average molecular weight of not less than 50,000, and a Mooney viscosity ML(1+4) at 125° C. of not less than 2.

8. The aging resistant rubber product according to claim 7, wherein, said aging resistant rubber product is a rubber expansion and contraction installation for bridge, which comprises a rubber expansion and contraction body, the rubber compound used for said rubber expansion and contraction body comprises said rubber composition.

9. The aging resistant rubber product according to claim 7, wherein, said aging resistant rubber product is a rubber and steel plate composite expansion and contraction installation, which comprises a rubber expansion and contraction body, the rubber compound used for said rubber expansion and contraction body comprises said rubber composition.

10. The aging resistant rubber product according to claim 7, wherein, said aging resistant rubber product is a rubber railway pad.

11. The aging resistant rubber product according to claim 7, wherein, said aging resistant rubber product is a rubber fender.

12. The aging resistant rubber product according to claim 7, wherein, said aging resistant rubber product is a rubber water stop.

13. The aging resistant rubber product according to claim 7, wherein, said aging resistant rubber product is a rubber roller.

14. The aging resistant rubber product according to claim 7, wherein, said aging resistant rubber product is a high temperature-resistant ribbed belt.

15. The aging resistant rubber product according to claim 7, wherein, said aging resistant rubber product is a windshield wiper.

16. The aging resistant rubber product according to claim 7, wherein, said aging resistant rubber product is a waterproof coil.

17. The aging resistant rubber product according to claim 7, wherein, said aging resistant rubber product is an inner tire.

18. The rubber composition according to claim 1, wherein the ethylene homopolymer has a degree of branching of from 60 to 102 branches/1000 carbon atoms.

19. The rubber composition according to claim 1, wherein the ethylene homopolymer has a degree of branching of from 82 to 102 branches/1000 carbon atoms.

* * * * *